(12) United States Patent
Sugimoto

(10) Patent No.: US 7,260,830 B2
(45) Date of Patent: Aug. 21, 2007

(54) METHOD AND APPARATUS FOR ESTABLISHING A SECURITY POLICY, AND METHOD AND APPARATUS FOR SUPPORTING ESTABLISHMENT OF SECURITY POLICY

(75) Inventor: Takahiro Sugimoto, Chuo-ku (JP)

(73) Assignee: Asgent, Inc., Tokyo (JP)

( * ) Notice: Subject to any disclaimer, the term of this patent is extended or adjusted under 35 U.S.C. 154(b) by 844 days.

(21) Appl. No.: 09/853,708

(22) Filed: May 14, 2001

(65) Prior Publication Data

US 2001/0049793 A1   Dec. 6, 2001

(30) Foreign Application Priority Data

Jun. 1, 2000   (JP)   ............................. 2000-164819
Apr. 27, 2001   (JP)   ............................. 2001-132177

(51) Int. Cl.
  *H04L 9/00*   (2006.01)
(52) U.S. Cl. ........................................................ 726/1
(58) Field of Classification Search ................. 705/50; 713/200; 726/1
  See application file for complete search history.

(56) References Cited

U.S. PATENT DOCUMENTS 5,164,988 A * 11/1992 Matyas et al. .............. 713/156
6,324,647 B1 * 11/2001 Bowman-Amuah ......... 713/201

FOREIGN PATENT DOCUMENTS

| JP | H7-141296 A | 6/1995 |
| JP | H7-262135 A | 10/1995 |
| JP | H11-168511 A | 6/1999 |
| JP | 2000-253066 A | 9/2000 |
| JP | 2001-251307 A | 9/2001 |
| JP | 273377 H | 10/2001 |
| WO | WO98/11477 | 3/1998 |
| WO | WO99/52039 | 10/1999 |
| WO | WO 00/08543 | 2/2000 |

OTHER PUBLICATIONS

Peltier, Thomas R., "Information security policies and procedures: a practioner's reference", Auerbach, 1998.*
Enger, Norman L. "Computer Security", AMACOM.*
Peltier, Thomas, "Information Security policies and procedures: a practitioner's reference" 1999.*
U.S. Appl. No. 09/690,901, filed Oct. 2000, Takahiro Sugimoto.
COBIT steering Committee and Information Systems Audit and Control Foundation : COBIT Executive Summary 2nd Edition (1998) (http://www.isaca.org/execl.htm).

(Continued)

*Primary Examiner*—Gilberto Barron, Jr.
*Assistant Examiner*—Thomas M Ho
(74) *Attorney, Agent, or Firm*—Oliff & Berridge, PLC

(57) ABSTRACT

There are provided a method of efficiently establishing a security policy and an apparatus for supporting preparation of a security policy. According to a method of establishing a security policy in six steps, a simple security policy draft is first prepared. The security policy draft is adjusted so as to match realities of an organization, as required, thus completing a security policy stepwise. Therefore, a security policy can be established in consideration of a schedule or budget of the organization.

39 Claims, 15 Drawing Sheets

OTHER PUBLICATIONS

ISO/IEC TR 13335-1-3 (GMITS) Technical Report (1996-1998).
Generally-Accepted System Security Principles (GASSP) V2 (1999) (http://web.mit.edu/security/www/gassopl.html).
Common Criteria V2 (http://csrc.nist.gov/cc/ccv20/ccv2list.htm).

"The Information Security Maturity Grid" Timothy R. Stacey Information System Security p. 22 Summer 1996.
Sun World vol. 9 No. 8, pp. 64-75, Aug. 1, 1999.
U.S. Appl. No. 09/690,901, filed Oct. 18, 2000.

* cited by examiner

| TYPE | DEFINITION |
|---|---|
| APPLICATION ADMINISTRATOR[APP] | ADMINISTRATOR FOR ADMINISTERING OPERATION OF APPLICATIONS OR OPERATION OF GROUP OF APPLICATIONS |
| APPLICATION SECURITY ADMINISTRATOR[ASA] | ADMINISTRATOR FOR ADMINISTERING LOCAL SECURITY OF APPLICATIONS OR LOCAL SECURITY OF GROUP OF APPLICATIONS |
| INTERNAL AUDIT[AUID] | OFFICER IN CHARGE OF INTERNAL AUDIT |
| CHIEF EXECUTIVE OFFICER[CEO] | OFFICER OR PRESIDENT HAVING A FINAL AUTHORITY TO MAKE DECISIONS AS TO INTERNAL BUSINESS, OPERATION,OR GENERAL MATTERS |
| CENTRAL INFORMATION OFFICER[CIO] | CENTRAL INFORMATION OFFICER,NOT A MERELY MEMBER IN CHARGE OF COMPUTERS.OFFICER IS CHARGED WITH THE RESPOSIBILITY FOR PLANNING AND CARRYING OUT UTILIZATION OF INFORMATION SYSTEMS AS A CORPORATE STRATEGY.THE OFFICER IS ALSO THE CHIEF OFFICER OF THE INFORMATION AND COMMUNICATION DEPARTMENTS. |
| DIRECTOR OF DISASTER RECOVERY[DRA] | SENIOR-LEVEL OFFICER IN CHARGE OF RECOVERING SYSTEM FROM DISASTER |
| DAIAL-IN ADMINISTRATOR[DIA] | ADMINISTRATOR IN CHARGE OF NETWORK SEGMENT OR DIAL-IN FOR DEPARTMENT |
| DIRECTOR OF INFORMATION PROTECTION[DIP] | INFORMATION SECURITY OFFICER |
| DISASTER RECOVERY ADMINISTRATOR[DRA] | DISASTER RECOVERY OFFICER FOR ADMINISTERING RECOVERY OF NETWORK SEGMENT ,HOST ,OR APPLICATIONS FROM DISASTER |
| DEPARTMENT SECURITY ADMINISTRATOR[DSA] | SECURITY ADMINISTRATOR FOR ADMINISTERING SECURITY OF NETWORK SEGMENT ,HOST ,OR APPLICATIONS IN EACH DEPARTMENT |
| DIRECTOR OF COMMUNICATION [DTC] | OFFICER IN CHARGE OF PHONE LINE AND ELECTRIC COMMUNICATION,INCLUDING WIDE RANGE OF NETWORK CONNECTION |
| FACILITATOR[FAC] | INTERVIEWER |
| FIREWALL ADMINISTRATOR [FWA] | MEMBER WHO ADMINISTERS OPERATION OF A FIREWALL HOST SYSTEM |
| HUMAN RESOURCES[HR] | DEPARTMENT IN CHARGE OF HIRING AND TRAINING EMPLOYEES |
| HOST ADMINISTRATOR[HST] | ADMINISTRATOR FOR ADMINISTERING OPERATION OF LOCAL HOST OR OPERATIONS OF GROUP OF LOCAL HOSTS |
| LEGAL OFFICER[LEG] | LEGARL ADVISER |
| NETWORK SEGMENT[NET] | ADMINISTRATOR FOR ADMINISTERING OPERATION OF NETWORK SEGMENT ,OR OPERATIONS OF GROUP OF NETWORK SEGMENT |
| PERSONAL COMPUTER ADMINISTRATOR[PCA] | OPERATION ADMINISTRATOR IN CHARGE OF LOCAL USER DESKTOP COMPUTERS |

Fig. 6

METHOD AND APPARATUS FOR ESTABLISHING A SECURITY POLICY, AND METHOD AND APPARATUS FOR SUPPORTING ESTABLISHMENT OF SECURITY POLICY

BACKGROUND OF THE INVENTION

1. Field of the Invention

The present invention relates to establishment of a so-called security policy. More particularly, the present invention relates to a method and apparatus which enable immediate establishment of a security policy suitable for an individual organization, as well as to a method and apparatus for supporting establishment of a security policy.

2. Background Art

In association with development of information technology, the importance of information security increases. Every organization takes various measures for protecting internal information.

For example, a firewall is set at an interface for establishing connection with an external network, thereby preventing unauthorized intrusion of the outsider into an internal network of the organization, or unauthorized access to internal information.

In order to combat computer viruses or the like, virus detection/combat software is employed for monitoring computers disposed in the organization. Throughout the specification, the expression "organization" signifies an enterprise, a federal or municipal agency, a corporation such as a legally-incorporated foundation, or any other party or organized group.

As mentioned above, various measures have hitherto been taken for ensuring information security.

If such measures are independently or separately discussed or reviewed, ensuring the security level of the entire organization becomes difficult.

For instance, no matter how well a firewall is enhanced, if third parties can freely enter the organization's building and have an opportunity to operate a terminal, the security level of the entire organization is considerably deteriorated.

Even if virus detection software is used, if updating of software for opposing new viruses is neglected, the software cannot combat newly created computer viruses.

In order to enhance the information security level of the entire organization, there must be devised a method for designing and implementing information security of the entire organization. Such a designing and implementation method (or a group of designing and implementation methods) is generally called a security policy.

Various proposals concerning basic headings and contents for establishing a standard security policy have already been put forward as international guidelines. As a matter of course, the headings and contents must be individually tailored to the organization.

Therefore, there still remains a necessity for establishing a security policy on a per-organization basis; security policies cannot be mass-produced. Thus, establishment of an individual security policy involves consumption of much time and effort.

Further, contents of a security policy must be changed with elapse of time. For instance, in a case where a corporate organizational structure has been changed, usage value and risk assessment of existing information must be changed correspondingly.

A common method concerning establishment of a security policy and making periodic amendments to the security policy has not been known. For this reason, individual systems engineer has had to establish or amend a security policy through experience and guess work. As a result, establishment of or making amendments to a security policy consumes an enormous amount of manpower. It is assumed that amendments may fail to catch up with a change in the actual circumstances (hereinafter called "reality") of an organization.

It has often bee seen that a wide difference arises between a security policy and the reality of an organization, thereby imposing difficulty in establishing and sustaining enhanced information security.

The present invention has been conceived in light of the foregoing drawbacks of the background art and is aimed at providing a method of efficiently establishing a security policy, as well as an apparatus for supporting establishment of a security policy.

SUMMARY OF THE INVENTION

To this end, the present invention provides a method of establishing a security policy for a predetermined organization, the method comprising:

a draft preparation step of preparing a security policy draft;

an analysis step of examining a difference between the security policy draft and realities of the organization; and an adjustment step of adjusting the security policy draft on the basis of the difference or adjusting operation rules of an actual information system belonging to the organization on the basis of the difference.

By means of such a configuration, a security policy can be established stepwise, thereby enabling efficient establishment of a security policy.

Preferably, the draft preparation step comprises: a preparation step of preparing inquiries to be submitted to members of an organization;

an inquiry step of submitting the prepared inquiries to the members;

an answer acquisition step of acquiring from the members answers to the inquiries; and a drafting step of preparing a security policy draft on the basis of the answers.

By means of such a configuration, a security policy draft can be prepared on the basis of inquiries.

Preferably, the preparation step involves preparation of inquiries on the basis of job specifications of members to be inquired.

Since inquiries are prepared according to a job specification of an member to be inquired, inquiries can be submitted efficiently.

Preferably, the answer acquisition step includes at least one of the steps of:

integrating the answers acquired from a single member from among the acquired answers and storing the integrated answers into storage means as answers of a single member to be inquired;

re-submitting inquiries to members if contradictory answers are included in the answers, to thereby resolve contradiction, and storing the answers into the storage means; and assigning weights to answers according to job specifications of the members to be inquired if contradictory answers are included in the answers, to thereby estimate answers and display the estimated answers.

Such a configuration enables integration of answers in a case where a plurality of inquirers separately submit inquiries to members to be inquired.

Preferably, the analysis step comprises at least one of:

a contradiction inspection step of inspecting whether or not contradictory answers are included in the answers;

a first difference detection step of inspecting a difference between an information system virtually designed on the basis of the answers and the security policy by means of comparison; and a second difference detection step of verifying the virtually-designed information system by means of examination of a real information system and inspecting a difference between the verified information system and the security policy draft by means of comparison.

Such a configuration enables finding of contradiction between answers and detection of a difference between a real information system and a security policy.

Preferably, the method of establishing a security policy further comprises a measurement step of devising measures addressing the inspected difference, in conjunction with the priority of the measures.

Such a configuration enables devising of measures with assigned priorities.

Preferably, the method of establishing a security policy further comprises a diagnosis step of diagnosing the security state of the organization, wherein a result of diagnosis performed in the diagnosis step is submitted to the organization, wherewith the organization can be come conscious of a necessity for a security policy.

Such a configuration enables ascertainment of security status of the organization.

Preferably, the method of establishing a security policy further comprises a priority planning step of planning, in sequence of priority, implementation with priority of the security measures which have been devised, thereby embodying a budget of the organization.

Such a configuration enables implementation of security measures in a premeditated manner, thereby facilitating preparation of a budget.

Preferably, the security measures comprise constructing a system for managing the establishing a security policy;

introduction of a security system;

training for compelling members respect a security policy;

analysis of system logs;

monitoring of a network;

auditing operations on the basis of the security policy; and reviewing the security policy.

Since the security measures involve training of members as well as introduction of information security equipment, thereby enabling attainment of a higher degree of information security.

Preferably, the method of establishing a security policy further comprises a security enhancement measures implementation step of implementing the security measures in accordance with the plan.

Such a configuration enables smooth implementation of security measures.

The present invention also provides a method of establishing a security policy comprising:

a preparation step of preparing inquiries to be submitted to members of an organization;

an inquiry step of submitting the prepared inquiries to the members;

an answer acquisition step of acquiring from the members answers to the inquiries; and an establishment step of establishing a security policy on the basis of the answers.

By means of such a configuration, a security policy draft can be prepared on the basis of inquiries.

Preferably, the preparation step involves preparation of inquiries on the basis of job specifications of members to be inquired.

Since inquiries are prepared according to a job specification of an member to be inquired, inquiries can be submitted efficiently.

Preferably, the answer acquisition step includes at least one of the steps of:

integrating the answers acquired from a single member from among the acquired answers and storing the integrated answers into storage means as answers of a single member to be inquired;

re-submitting inquiries to members if contradictory answers are included in the answers, to thereby resolve contradiction, and storing the answers into the storage means; and assigning weights to answers according to job specifications of the members to be inquired if contradictory answers are included in the answers, to thereby estimate answers and display the estimated answers.

Such a configuration enables integration of answers in a case where a plurality of inquirers separately submit inquiries to members to be inquired.

Preferably, the establishment step involves establishment of three levels of security policies; namely, an executive-level security policy which describes the organization's concept and policy concerning information security in conformity with global guidelines;

a corporate-level security policy which describes an information security system embodying the executive-level security policy; and a product-level security policy which describes measures to implement the executive-level security policy with reference to the corporate-level security policy.

Since three levels of security policies are established, a hierarchical security policy can be obtained. Here, the measures to implement the executive-level security policy with reference to the corporate-level security policy includes operation rules for utilizing the security policies, as well as hardware and software.

Preferably, the corporate-level security policy describes standards for the information security system of the overall organization; and standards for individual equipments constituting the information security system of the organization.

Such a configuration clarifies a security policy for the entire organization and a security policy for individual pieces of equipment. Here, equipment is a concept including networks, hosts, and applications.

Preferably, the product-level security policy includes two types of product-level policies; namely, a first-level security policy describing settings of individual equipments constituting the information security system in natural language; and a second-level security policy describing settings of individual equipments constituting the information security system in specific language used in specific equipments.

The first-level product-level security policy enables a human to understand a security policy. The second-level product-level security policy facilitates setting of individual equipment. Here, equipment includes both hardware and software constituting the information security system.

Preferably, the analysis step comprises a contradiction inspection step of inspecting whether or not contradictory answers are included in the answers; and a difference detection step of inspecting whether or there is a difference between an information system virtually designed on the basis of the answers and a real information system of the organization.

Such a configuration enables efficient detection of contradiction or difference.

Preferably, the method of establishing a security policy further comprises a measurement step of devising measures addressing the inspected difference, in conjunction with the priority of the measures.

Since measures are devised in conjunction with priorities thereof, planning for implementing information security is facilitated.

The present invention also provides an apparatus of establishing a security policy comprising:

inquiry preparation means of preparing inquiries to be submitted to members of an organization;

storage means for storing answers to the inquiries;

answer archival storage means for acquiring from the members the answers to the inquiries and storing the answers into the storage means; and establishment means for establishing a security policy on the basis of the answers stored in the storage means.

Since inquiries to be submitted to members are prepared, inquiry operations are facilitated. Here, the expression "member" signifies any individual associated with an information system of the organization. Therefore, members include part-time employees and employees of affiliated corporations, as well as employees of an organization of interest.

Preferably, the inquiry preparation means prepares inquiries to be submitted to the members to be inquired, on the basis of job specifications of the members to be inquired.

Since inquiries are prepared according to a job specification of an member to be inquired, inquiries can be submitted efficiently.

Preferably, the answer archival storage means integrates the answers acquired from a single member from among the acquired answers and stores the integrated answers into the storage means as answers of a single member to be inquired; or re-submits inquiries to members if contradictory answers are included in the answers, to thereby resolve contradiction, and stores the answers into the storage means; or assigns weights to answers according to job specifications of the members to be inquired if contradictory answers are included in the answers, to thereby estimate answers, and display the estimated answers.

Such a configuration enables integration of answers while ensuring a match among the answers in a case where a plurality of inquirers separately submit inquiries to members to be inquired.

Preferably, the establishment means establishes three levels of security policies; namely, an executive-level security policy which describes the organization's concept and policy concerning information security in conformity with global guidelines;

a corporate-level security policy which describes an information security system embodying the executive-level security policy; and a product-level security policy which describes measures to implement the executive-level security policy with reference to the corporate-level security policy.

Since three levels of security policies are established, a hierarchical security policy can be obtained. Here, the measures for implementing the executive-level security policy with reference to the corporate-level security policy include operation rules for utilizing the security policies, as well as hardware and software.

Preferably, the corporate-level security policy describes standards for the information security system of the overall organization; and standards for individual equipments constituting the information security system of the organization.

Such a configuration clarifies a security policy for the entire organization and a security policy for individual pieces of equipment. Here, equipment is a concept including networks, hosts, and applications.

Preferably, the product-level security policy includes two types of product-level policies; namely, a first-level security policy describing settings of individual equipments constituting the information security system in natural language; and a second-level security policy describing settings of individual equipments constituting the information security system in specific language used in specific equipments.

The first-level product-level security policy enables a human to understand a security policy. The second-level product-level security policy facilitates setting of individual equipment. Here, equipment includes both hardware and software constituting the information security system.

The present invention also provides a method of assessing the state of security of an organization, the method comprising:

an inquiry preparation step of preparing inquiries to be submitted to members of an organization;

an inquiry step of submitting the prepared inquiries to the members;

an answer acquisition step of acquiring from the members answers to the inquiries; and a security state assessment step of assessing the state of security on the basis of the answers.

By means of such a configuration, the security state of an organization can be ascertained on the basis of answers to inquiries.

Preferably, the inquiry preparation step involves preparation of inquiries on the basis of job specifications of members to be inquired.

Since inquiries are prepared according to a job specification of an member to be inquired, inquiries can be submitted efficiently.

Preferably, the answer acquisition step involves integration of previous answers and acquired answers in a case where the answers are provided by a member to be inquired who has provided answers before, and involves storage of the integrated answers into storage means as answers from a single member to be inquired.

Such a configuration enables integration of answers while ensuring a match among the answers in a case where a plurality of inquirers submit separately inquiries to members to be inquired.

Preferably, the assessment of a security state includes assessment of security of the organization;

average assessment of security of the other organizations included in an industry to which the organization pertains; and the highest security assessment which is considered to be attainable by organizations in the industry to which the organization pertains.

Such a configuration enables assessment of an organization in comparison with similar organizations. Further, display of a theoretical highest value assists manager to set a goal to be attained.

Preferably, the assessment of a security state includes scores assigned to the following items; namely, understanding and attitude concerning security;

a security system of the organization;

a response to unexpected accidents;

preparation of a budget for security; and measures to improve security.

Such a configuration enables an organization to ascertain assessment of information security on a per-item basis in respect of manager's concept.

The present invention also provides an apparatus for assessing the state of security of an organization, the apparatus comprising:

preparation means for preparing inquiries to be submitted to members of an organization;

storage means for storing answers to the inquiries;

answer archival storage means for acquiring the answers to the inquiries from the members and storing the answers into the storage means; and security maturity preparation means for preparing a security maturity report representing the degree of maturity of security, on the basis of the answers stored in the storage means.

Inquiries are submitted to members, and an organization can as certain its security on the basis of answers to the inquiries.

Preferably, the answer archival storage means integrates previous answers and acquired answers in a case where the answers are provided by an member to be inquired who has provided answers before, and stores the integrated answers into the storage means as answers from a single member to be inquired.

Such a configuration enables integration of answers while ensuring a match among the answers in a case where a plurality of inquirers submit separately inquiries to members to be inquired.

Preferably, the security maturity report includes the degree of maturity of the organizations security;

the average degree of maturity of security of other organizations included in an industry to which the organization pertains; and the highest degree of maturity of security which is considered to be attainable by organizations in the industry to which the organization pertains.

Such a configuration enables assessment of an organization in comparison with other organizations in respect of average degree. Further, display of a theoretical highest value facilitates setting of a goal to be attained.

Preferably, the security maturity report includes scores assigned to the following items; namely, understanding and attitude concerning security;

a security system of the organization;

response to unexpected accidents;

preparation of a budget for security; and measures to improve security.

Such a configuration enables an organization to ascertain assessment of information security on a per-item basis in respect of manager's concept.

The present invention also provides an analyzer for analyzing a difference between a security policy and an information system of an organization, comprising contradiction inspection means for inspecting whether or not contradiction exists between individual answers in response to inquiries submitted to members of the organization; and contradiction output means for outputting information about the inspected contradiction.

Such a configuration enables ascertainment of contradiction included in answers.

Preferably, the analyzer for analyzing a difference between a security policy and an information system of an organization further comprises indicating means for indicating the contradiction on the basis of the information about contradiction;

establishment means for virtually establishing an information system for the organization on the basis of the answers produced by the matching means; and difference output means for outputting a difference between the configuration of the virtually-established information system and a security policy, by means of comparison.

Such a configuration enables ascertainment of a difference between a security policy and realities of an organization.

Preferably, the analyzer for analyzing a difference between a security policy and an information system of an organization further comprises real system input means for examining the information system of the organization and entering the configuration of the information system; and difference output means which verifies the virtually-established information system by reference to the configuration of the information system and outputs a difference between a security policy and the configuration of the virtually-established information system which has been verified, by means of comparison.

Such a configuration enables comparison between an information system which has been verified by means of actual examination of an information system and a security policy, thereby enabling accurate analysis of a difference.

An invention according to a second embodiment will now be described.

To solve the previously-described problem, in the inquiry preparation step, the inquiries are prepared in accordance with the line of business of the organization.

Preferably, the inquiry preparation means generates inquiries to be submitted to an interviewee in accordance with the line of business of the organization.

According to the present invention, the line of business of an organization is taken into account. Hence, a security policy corresponding to a line of business can be established.

An invention according to a third embodiment will now be described.

According to the present invention, in the drafting step, a security policy is drafted on the basis of recommendations or regulations aimed at a specific line of business.

According to the present invention, the establishment means establishes a security policy on the basis of items of recommendations or regulations aimed at a specific line of business.

Such a configuration enables establishment of a security policy for items which are of greater detail than general-purpose global guidelines, in connection with a specific line of business.

An invention according to a fourth embodiment will be described hereinbelow.

According to the present invention, in the establishment step, a security policy is established on the basis of items of global guidelines of one or a plurality of types prescribed by a user.

According to the present invention, the establishment means establishes a security policy on the basis of items of global guidelines of one or a plurality of types prescribed by a user.

By means of the configuration of the invention, a user can select a global guidelines to be employed.

According to the present invention, in the inquiry preparation step, inquiries are generated on the basis of items of global guidelines of one or a plurality of types prescribed by a user.

Similarly, the inquiry preparation means generates inquiries to be submitted to interviewees, on the basis of items of global guidelines of one or a plurality of types prescribed by a user.

By means of such a configuration, inquiries complying with a global guideline prescribed by the user are submitted, thereby enabling efficient inquiries.

An invention according to a fifth embodiment will now be described.

According to the present invention, in the establishment step, a security policy is established on the basis of an indicator of rigorousness of security policy prescribed by the user.

According to the present invention, the establishment means establishes a security policy on the basis of an indicator of rigorousness of security policy prescribed by the user.

By means of the configuration according to the present invention, the user can freely specify the level of rigorousness of security policy through use of security policy.

According to the present invention, in the inquiry preparation step, the inquiries are generated on the basis of an indicator of rigorousness of security policy prescribed by the user.

Similarly, according to the present invention, the inquiry preparation means generates inquiries, on the basis of an indicator of rigorousness of security policy prescribed by the user.

By means of such a configuration, inquiries are generated in accordance with the level of rigorousness prescribed by the user. As will be described later, if a higher level of rigorousness is prescribed, the number of general inquiries is increased, so that inquiries concerning detailed items are generated. In contrast, if a lower level of rigorousness is prescribed, the number of general inquiries is reduced, and inquiries become less elaborate. Since inquiries according to the level of rigorousness are generated, inquiries can be made more efficiently.

The present invention provides a security policy rigorousness adjustment method for adjusting the level of rigorousness of a security policy, comprising:

a rigorousness adjustment step of replacing the rules which have been determined not to match the indicator of rigorousness prescribed by a user with rules matching the indicator of rigorousness; and a merge and output step of merging the rules matching the indicator of rigorousness from the beginning with the rules which in the rigorousness adjustment step have replaced the rules not matching the indicator and of outputting the merged rules.

Further, the present invention provides a security policy rigorousness adjustment apparatus for adjusting the level of rigorousness of a security policy, comprising:

rigorousness adjustment means for replacing the rules which have been determined not to match the indicator of rigorousness prescribed by a user with rules matching the indicator of rigorousness; and Merge and output means for merging the rules matching the indicator of rigorousness from the beginning with the rules which in the rigorousness adjustment step have replaced the rules not matching the indicator and for outputting the merged rules.

By means of these configurations according to the present invention, the level of rigorousness of security policy can be adjusted such that a level of rigorousness prescribed by the user is achieved.

An invention according to a sixth embodiment will now be described.

The present invention provides a method of establishing a security policy of a predetermined organization, comprising:

an inquiry preparation step of generating inquiries which pertain to items required for establishing a security policy of the organization and are to be submitted to members of the organization;

an inquiry submission step of submitting the generated inquiries to the members;

an answer acquisition step of acquiring from the members answers to the inquiries; and a preparation step of preparing a security policy draft on the basis of the answers, wherein, in the establishment step, a security policy within a range of establishment prescribed by the user is established.

By means of the configuration set forth, a security policy falling within the range prescribed by the user is obtained.

According to the present invention, in the inquiry preparation step, inquiries pertaining to the range of establishment prescribed by the user are generated.

By means of such a configuration according to the present invention, only inquiries about the range prescribed by the user are generated. Hence, submission of inquiries irrelevant to the range is prevented.

The present invention provides a security policy establishment apparatus for establishing a security policy of a predetermined organization, comprising:

inquiry preparation means for generating inquiries which pertain to items required for establishing a security policy of the organization and are to be submitted to members of the organization;

storage means for storing answers to the generated inquiries;

answer archival storage means for acquiring answers to the generated inquiries and storing the answers into the storage means; and establishment means for establishing a security policy within the range of establishment prescribed by the user.

By means of such a configuration, there is obtained a security policy falling within the range prescribed by the user.

According to the present invention, the inquiry preparation means generates inquiries pertaining to the range of establishment prescribed by the user.

Such a configuration enables generation of only inquiries pertaining to a range prescribed by the user. Hence, submission of inquiries irrelevant to the range is prevented.

An invention according to an seventh embodiment will be described.

The seventh embodiment describes programs for causing a computer to perform the operations which have been described thus far and a recording medium (hard disk drive)

having the programs recorded thereon. Hence, operations of the programs and operation of the recording medium having the programs recorded thereon are identical with those of the inventions which have been described thus far.

The present invention provides a computer-readable recording medium having recorded thereon a program for causing a computer to perform:

inquiry preparation procedures for generating inquiries which pertain to items required for establishing a security policy of the organization and are to be submitted to members of the organization;

answer archival procedures for entering answers to the generated inquiries and storing the answers into storage means; and establishment procedures for establishing a security policy on the basis of the answers stored in the storage means.

According to the present invention, in the inquiry preparation procedures, inquiries to be submitted to interviewees are generated on the basis of job specifications of the interviewees.

According to the present invention, in the answer archival procedures, the answers acquired from a single member from among the acquired answers are integrated, and the integrated answers are stored into the storage means as answers of a single member to be inquired; or weights are assigned to answers according to job specifications of the members to be inquired if contradictory answers are included in the answers, to thereby estimate final answers and display the estimated final answers.

According to the present invention, in the inquiry preparation procedures, inquiries to be submitted to the interviewees are generated on the basis of the line of business of the organization.

According to the present invention, in the establishment procedures, a security policy is established on the basis of items of global guide lines of one or a plurality of types prescribed by a user.

According to the present invention, in the inquiry preparation procedures, the inquiries are generated on the basis of an indicator of rigorousness of security policy prescribed by the user.

According to the present invention, in the establishment procedures, a security policy within a range of establishment prescribed by the user is established.

The present invention provides a computer-readable recording medium having recorded thereon a program for causing a computer to perform:

inquiry preparation procedures for generating inquiries which pertain to items required for evaluating the degree of maturity of security of a predetermined organization and are to be submitted to members of the organization;

answer archival procedures for entering answers to the prepared inquiries and storing the answers into storage means; and security maturity preparation procedures for preparing a security maturity report representing the degree of maturity of security, on the basis of the answers stored in the storage means.

The present invention provides a computer-readable recording medium having recorded thereon a program for causing a computer to perform:

contradiction inspection procedures for inspecting whether or not contradiction exists between individual answers submitted in response to inquiries which pertain to items required for ascertaining a difference between a security policy of the predetermined organization and an information system of the organization and which have been submitted to members of a predetermined organization; and contradiction output procedures for outputting information about the inspected contradiction.

Preferably, the recording medium further comprises:

matching procedures for matching the answers on the basis of the information about contradiction, thus producing answers free of contradiction;

establishment procedures for virtually establishing the configuration of an information system of the organization, on the basis of the answers produced by the matching means; and difference output procedures for outputting a difference between the configuration of the virtually-established information system and the security policy, obtained by means of comparison.

The present invention provides a computer-readable recording medium having recorded thereon a program for causing a computer to perform:

level-of-rigorousness inspection procedures for inspecting whether or not individual rules of the security policy match an indicator of rigorousness prescribed by a user;

rigorousness adjustment procedures for replacing the rules which have been determined not to match the indicator in the level-of-rigorousness inspection step with rules matching the indicator of rigorousness; and merge and output procedures for merging the rules matching the indicator of rigorousness from the beginning with the rules which in the rigorousness adjustment step have replaced the rules not matching the indicator and for outputting the merged rules.

The inventions set forth relate to a recording medium. Next, an invention related to a program will be described.

The present invention provides a program for causing a computer to perform:

inquiry preparation procedures for generating inquiries which pertain to items required for establishing a security policy of a predetermined organization and are to be submitted to members of the organization;

answer archival procedures for entering answers to the prepared inquiries and storing the answers into storage means; and establishment procedures for establishing a security policy on the basis of the answers stored in the storage means.

According to the present invention, in the inquiry preparation procedures, inquiries to be submitted to interviewees are generated on the basis of job specifications of the interviewees.

According to the present invention, in the answer archival procedures, the answers acquired from a single member from among the acquired answers are integrated, and the integrated answers are stored into the storage means as answers of a single member to be inquired; or weights are assigned to answers according to job specifications of the members to be inquired if contradictory answers are included in the answers, to thereby estimate final answers and display the estimated final answers.

According to the present invention, in the inquiry preparation procedures, inquiries to be submitted to the interviewees are generated on the basis of the line of business of the organization.

According to the present invention, in the establishment procedures, a security policy is established on the basis of items of global guidelines of one or a plurality of types prescribed by a user.

According to the present invention, in the inquiry preparation procedures, the inquiries are generated on the basis of an indicator of rigorousness of security policy prescribed by the user.

According to the present invention, in the establishment procedures, a security policy within a range of establishment prescribed by the user is established.

The present invention provides a program for causing a computer to perform:

inquiry preparation procedures for generating inquiries which pertain to items required for evaluating the degree of maturity of security of a predetermined organization and are to be submitted to members of the organization;

answer archival procedures for entering answers to the generated inquiries and storing the answers into storage means; and security maturity preparation procedures for preparing a security maturity report representing the degree of maturity of security, on the basis of the answers stored in the storage means.

The present invention provides a program for causing a computer to perform:

contradiction inspection procedures for inspecting whether or not contradiction exists between individual answers in response to inquiries which pertain to items required for ascertaining a difference between a security policy of the predetermined organization and an information system of the organization and which have been submitted to members of a predetermined organization; and contradiction output procedures for outputting information about the inspected contradiction.

According to the present invention, the program further comprises:

matching procedures for matching the answers on the basis of the information about contradiction, thus producing answers free of contradiction;

establishment procedures for virtually establishing the configuration of an information system of the organization, on the basis of the answers produced by the matching means; and difference output procedures for outputting a difference between the configuration of the virtually-established information system and the security policy, obtained by means of comparison.

The present invention provides a program for causing a computer to perform:

level-of-rigorousness inspection procedures for inspecting whether or not individual rules of the security policy match an indicator of rigorousness prescribed by a user;

rigorousness adjustment procedures for replacing the rules which have been determined not to match the indicator in the level-of-rigorousness inspection step with rules matching the indicator of rigorousness; and merge and output procedures for merging the rules matching the indicator of rigorousness from the beginning with the rules which in the rigorousness adjustment step have replaced the rules not matching the indicator and for outputting the merged rules.

BRIEF DESCRIPTION OF THE DRAWINGS

FIG. 6 is a listing of types representing job specifications;

DETAILED DESCRIPTION OF THE PREFERRED EMBODIMENT

A preferred embodiment of the present invention will now be described hereinbelow by reference to the accompanying drawings.

First Embodiment

There will be described a business model concerning a round of operations from establishment of a security policy of a certain organization to maintenance of the security policy. Preferably, the business model is implemented by a system engineer through use of a predetermined expert system.

Figure 1:
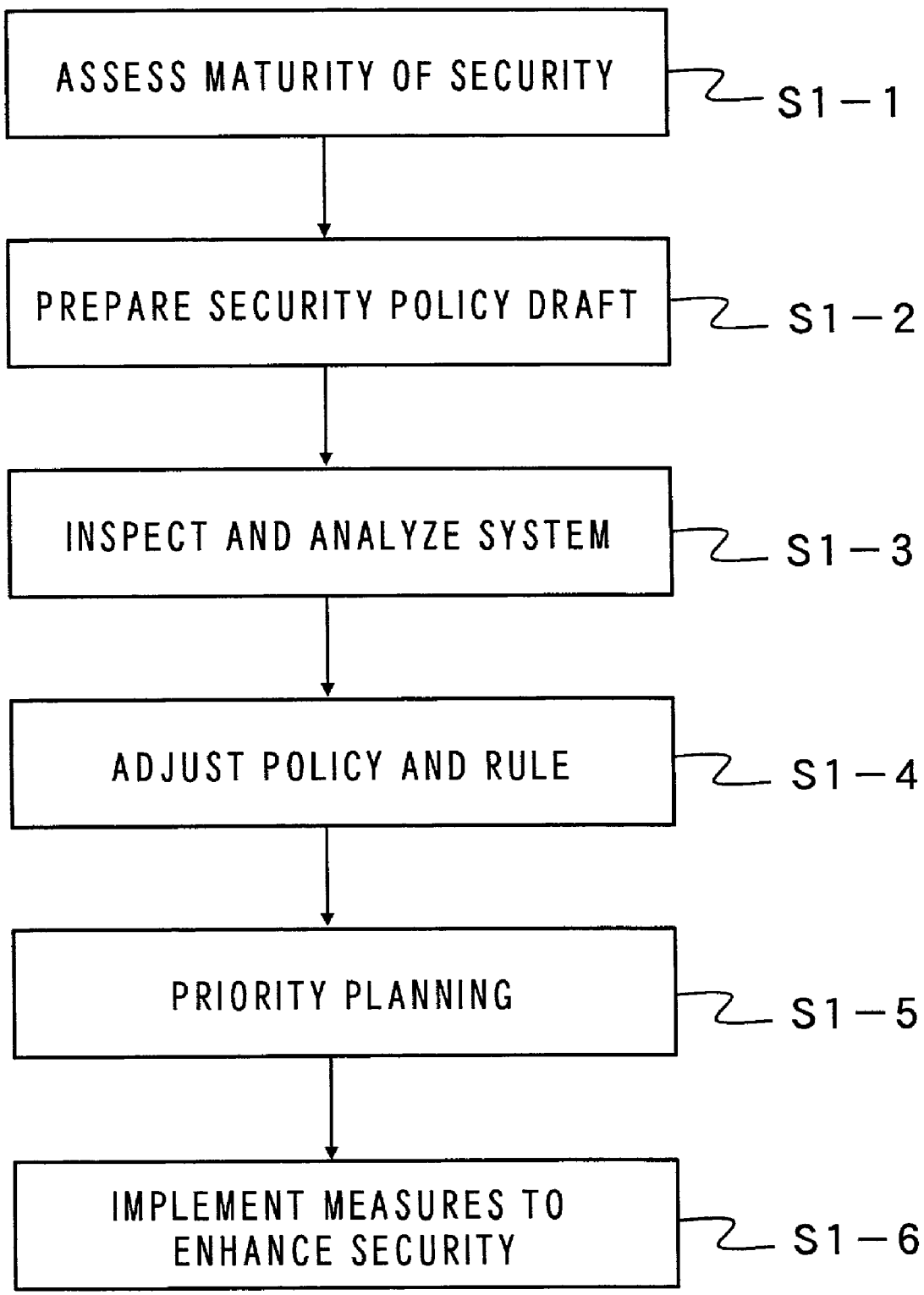
FIG. 1 is a flowchart representing the principle of a business model according to a preferred embodiment of the present invention.

The principle of the business model according to a first embodiment of the present invention will first be described. FIG. 1 shows a flowchart representing the principle of such a business model. As illustrated by the drawing, the business model according to the present invention is basically made up of the following six steps.

Step 1: Assessment of security maturity
Step 2: Preparation of a security policy draft
Step 3: System, and inspection and analysis of the system
Step 4: Coordination between a policy and rules
Step 5: Priority Planning
Step 6: Implementation of measures to enhance security.

According to the security establishment method consisting of six steps, an interview-based security policy draft is first established. If necessary, the security policy draft is re-adjusted so as to reflect the reality of an organization.

Since the security policy is completed stepwise, the security policy can be established in accordance with the schedule or budget of an organization.

Step 1 is for evaluating the current state of information security of an organization. Through assessment of information security, the organization can ascertain the goal to be attained in respect of manager's concept.

Step 2 is for preparing an elementary security policy draft by means of submitting inquiries to members of the organization. The security policy draft is prepared by means of simple interview, and hence a security policy can be prepared at relatively low cost.

Step 3 is for reviewing a difference between the virtually constructed information system and the reality of the organization. Since the virtually constructed information system is prepared on the basis of mere answers to the inquiries, a difference may arise between the virtually constructed information system and the reality of the organization.

Step 4 is for adjusting, in accordance with a difference, a security policy or rules about security products which have already been introduced.

Step 5 is for establishing a future information security plan, taking into consideration precedence in adopting means or measures.

Step 6 is for performing required security protection measures according to the information security plan.

Since the security policy is established stepwise as mentioned above, a security policy can be established in accordance with realities of each organization; that is, the budget or concept of each organization.

For instance, it depends on the company's way of thinking or budget that a security policy draft is sufficient or not. Priority planning makes a future plan specific, and hence there will be yielded an advantage of easy development of a budget for the organization.

The dominant steps of the business model according to the present embodiment reside particularly in steps 2 through 4. In step 2, an elementary security policy draft is prepared. In step 3, a difference between the security policy draft and the realities of an organization is analyzed. In step 4, a security policy or rules for security products which have already been introduced are adjusted. So long as a business model includes at least steps 2 through 4, the business model enables systematic establishment of a security policy. Such a business model enables an increase in productivity and quality relative to a conventional method based on experience and intuition.

In order to implement such stepwise establishment of a security policy, various expert systems are used in the first embodiment.

Steps 1 through 6 will now be described individually, including a method of using expert systems.

A. Step 1: Assessment of Security Maturity

In this step, maturity of current information security of an organization is objectively assessed. Through such an appraisal, the organization can be rated in terms of security. More specifically, assessment of information security is performed by means of preparing the security maturity appraisal report.

In the first embodiment, security maturity is assessed on the basis of a Software Capability Maturity Model developed by Carnegie Mellon University in the U.S. According to this model, security maturity is quantitatively assessed with regard to five headings. In other words, scores are assigned for each of the five headings.

The five headings are as follows:
a: Comprehension and posture of an administrator regarding information security
b: Security status of an organization
c: Response to an unexpected disaster
d: Budgeting for security
e: Measures to improve security Here, an unexpected disaster mean an event which threatens information security; for example, a wiretapping activity or faulty operation of equipment. Entry "c"; i.e., response to unexpected disaster, represents whether or not the organization can address unexpected disaster. Entry "d"; i.e., budgeting for security, represents whether or not a sufficient budget is ensured for information security. Entry "e"; i.e., measures to improve security, represents the extent to which a schedule or plan for security improvement is made.

In the first embodiment, a maturity assessment report is prepared with regard to the above-described five headings, and includes scores. By means of such a report, the objective estimation of manager's understanding for information system security of an organization can be ascertained.

A specific method of preparing the security maturity assessment report will now be described.

In the first embodiment, inquiries are submitted to the organization's manager(CEO, president, etc . . . ) and an maturity assessment report is prepared on the basis of answers to the inquiries. More specifically, an appraisal device 10 shown in FIG. 2 performs preparation of inquiries, collection of answers, and preparation of the security maturity assessment report. FIG. 3 shows a flowchart representing operations for preparing the security maturity assessment report. The flowchart shown in FIG. 3 shows, in more detail, processing pertaining to step S1-1 shown in FIG. 1.

Figure 2:
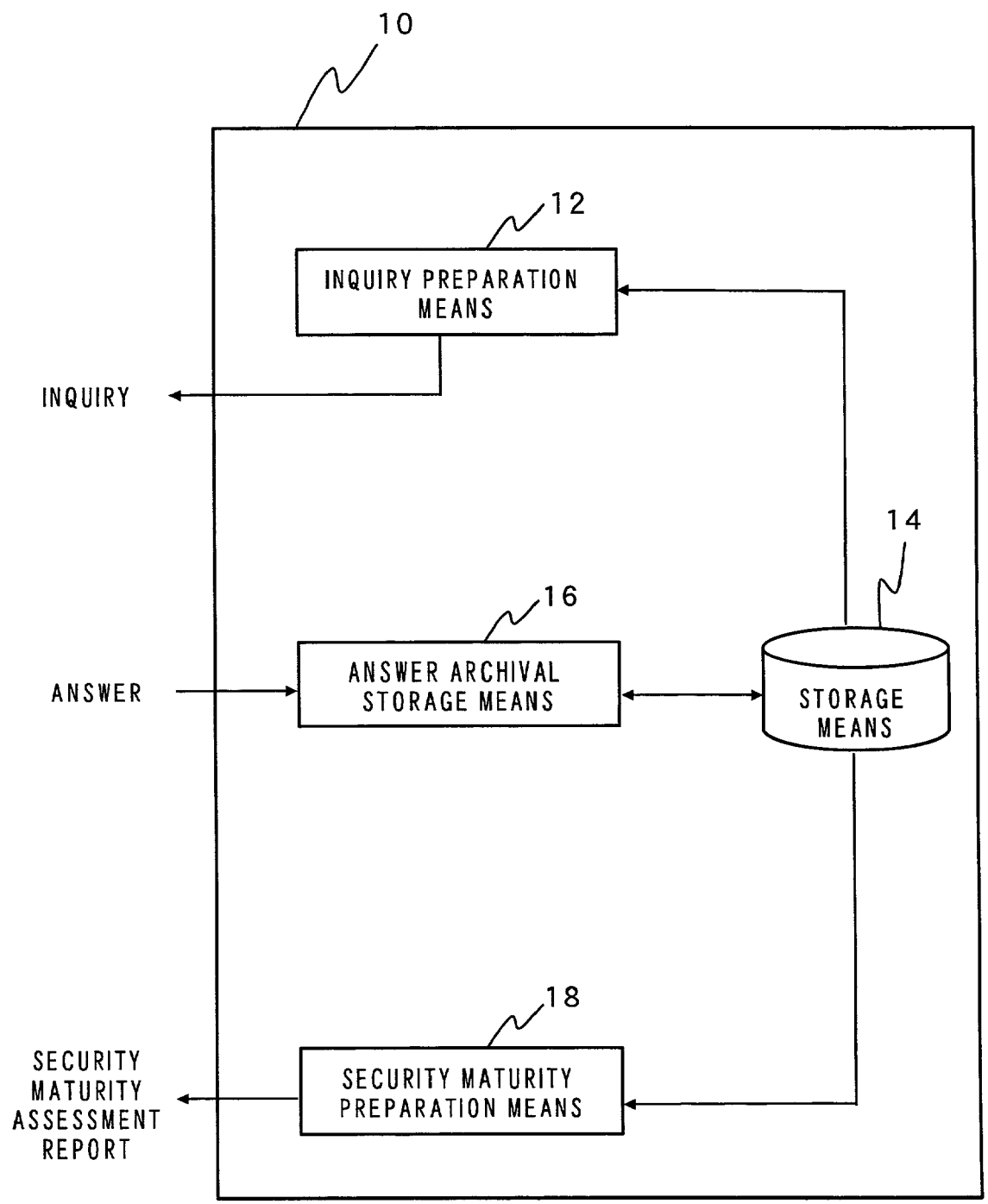
FIG. 2 is a block diagram showing the configuration of an appraisal device.
Figure 3:
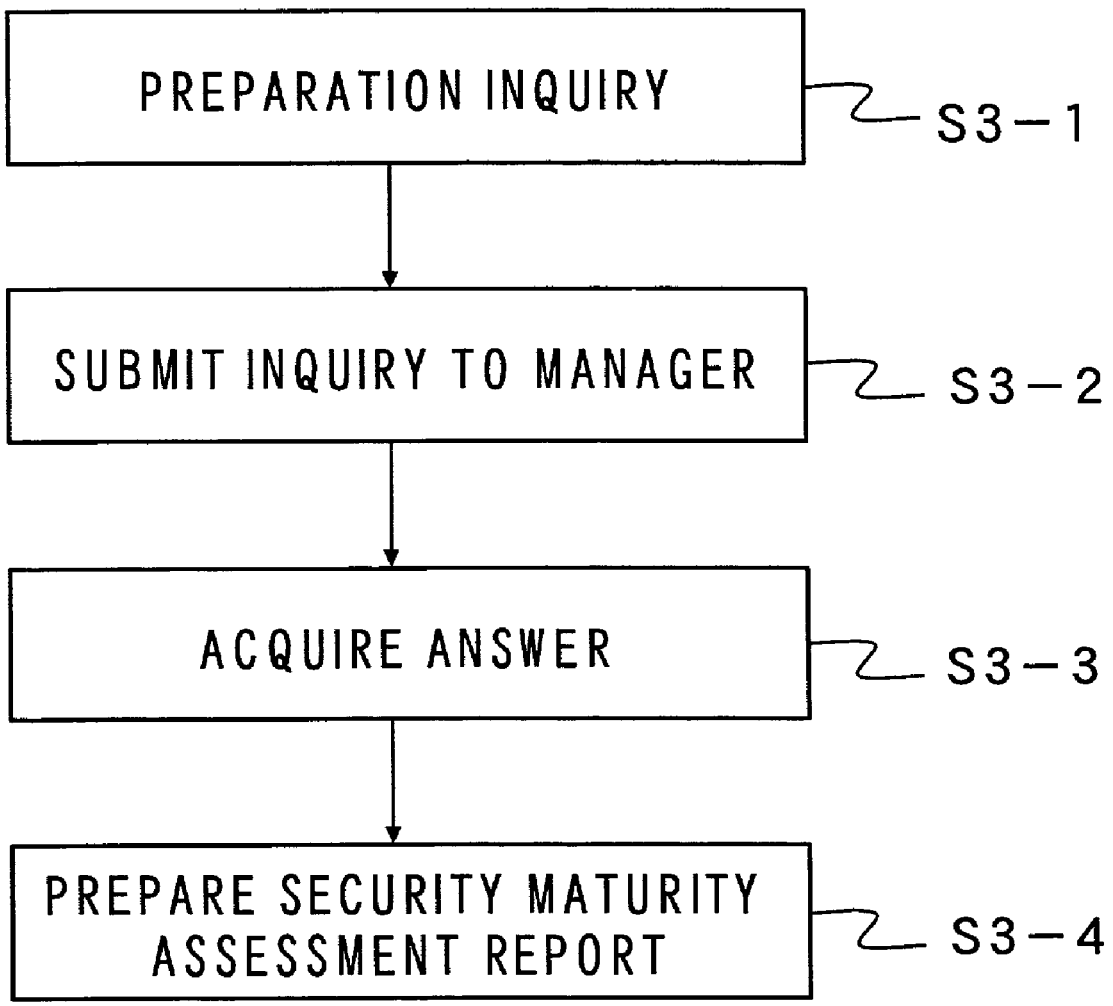
FIG. 3 is a flowchart representing preparation of an appraisal report.

As shown in FIG. 2, the appraisal device 10 has inquiry preparation means 12 for preparing inquiries to be submitted to managers to be inquired.

A variety of inquiries are stored beforehand in the storage means 14, and the inquiry preparation means 12 extracts inquiries required for a member to be inquired.

The appraisal device 10 has answer archival storage means 16. Answers submitted by managers in response to inquiries which have been prepared in the manner as mentioned above are supplied to the answer archival storage means 16. The answer archival storage means 16 preserves answers in the storage means 14.

The first embodiment is also characterized in that the answer archival storage means 16 has an answer integration function. In a case where inquiries are submitted by a plurality of systems engineers, answers to the inquiries are collectively stored in the storage means 14 according to the answer integration function. In a case where a large number of managers are to be inquired, answers can be immediately acquired by means of a plurality of systems engineers sharing the load of submitting inquiries to the managers through interview. In such a case, the resultant answers are accumulated in a plurality of computers. Therefore, these answers must be integrated into a single database.

As a matter of course, the answer integration function can be utilized for integrating answers submitted by a single manager to be inquired as a result of inquiries having been submitted to the manager and answers having been acquired from the manager on several occasions, for reasons that submitting inquiries to the manager and receiving answers to the inquires from the member could not be performed on a single occasion.

The appraisal device 10 has security maturity preparation means 18, which prepares the security maturity report, or an assessment report about information security of an organization, on the basis of the group of answers stored in the storage means 14.

This appraisal device 10 is a so-called expert system.

There is employed the appraisal device 10 having the function of integrating collected answers. Consequently, the security maturity assessment report can be prepared efficiently and precisely.

By reference to the flowchart shown in FIG. 3, there will be described an operation for preparing the security maturity assessment report.

In step S3-1, inquiries to be submitted to the member are prepared by the inquiry preparation means 12.

In step S3-2, a systems engineer submits the thus-prepared inquiries to the manager.

In step S3-3, answers to the inquiries are acquired from the manager and delivered to the answer archival storage means 16 of the appraisal device 10. As set forth, the answer archival storage means 16 has the answer integration function and sends the answers to the storage means 14 after having integrated them into a single database.

In step S3-4, the security maturity report preparation means 18 prepares the security maturity assessment report including scores assigned to five respective headings, on the basis of the group of answers stored in the storage means 14.

As mentioned above, the security maturity assessment report is prepared through use of the appraisal device 10.

Comparison between Industry Standard and Scores Described in Security Maturity Assessment Report As mentioned previously, scores (points) are assigned to five respective headings described in the security maturity assessment report.

The first embodiment is characterized particularly in that an average of scores assigned to all the organizations and the highest score in an industry to which the organization pertains are displayed along with a score assigned to the security maturity assessment report. Here, the expression "highest score" is the top score (a theoretical value) which can be attained by any organization belonging to the industry.

As a result, the ranking of efforts made by the organization for ensuring information security in the industry can be readily ascertained. Such a mean value and the maximum value in an individual industry are stored in the storage means 14 beforehand. Further, an average value is updated periodically.

Report on the Progress of Implementation of Security Measures

In the first embodiment, the security maturity assessment report is prepared to the manager's understanding for information security of an organization is investigated prior to establishment of a security policy. However, so long as the security maturity report is prepared during the course of sequential implementation of measures for information security, the progress of implementing measures for information security can be ascertained. Accordingly, a step of preparing the security maturity report also serves as a step of reporting the progress of implementation of security.

In the appraisal device 10 according to the first embodiment, all the inquiries and corresponding answers are stored in the storage means 14. However, it may be the case that inquiries are stored in one storage means and answers are stored in another storage means.

B. Step 2: Preparation of Security Policy Draft

In this step, a simple security policy draft of an organization is prepared. The draft corresponds to a security policy based on answers are submitted by members of the organization in response to inquiries. Since an actual information system of the organization has not yet been investigated, a security policy cannot be established immediately.

Various basic headings and contents used for establishing a standard security policy have already been known as international guidelines. These guidelines are hereinafter called global guidelines. In the present embodiment, a security policy draft is prepared by means of extracting principles from the global guidelines and combining the thus-extracted principles, as required.

Figure 4:
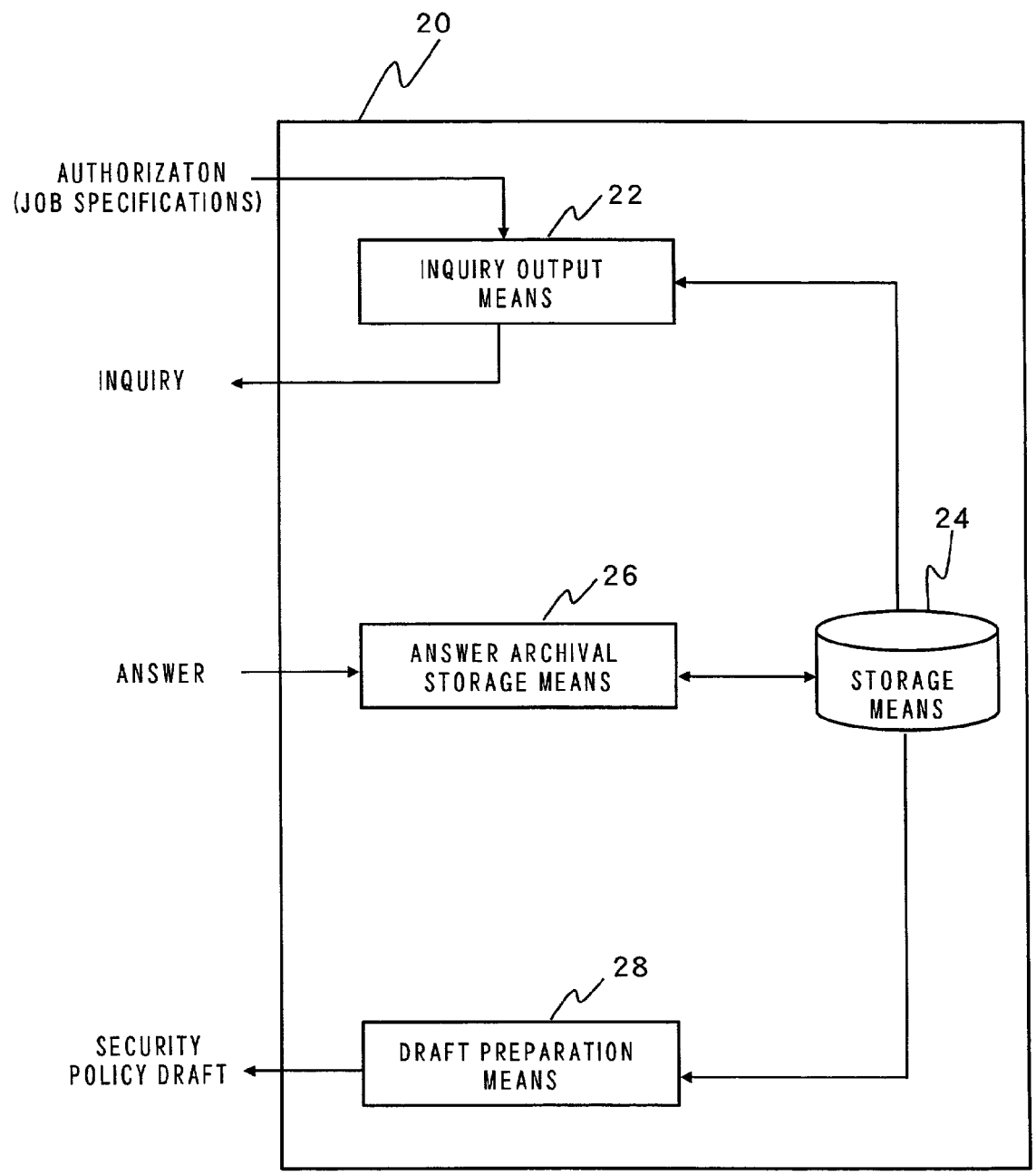
FIG. 4 is a block diagram showing the configuration of an apparatus for preparing a security policy draft.

In the first embodiment, a security policy draft preparation apparatus 20 is used for preparing a security policy draft. FIG. 4 is a block diagram showing the configuration of the security policy draft preparation apparatus 20.

As shown in FIG. 4, the security policy draft preparation apparatus 20 has inquiry preparation means 22 for preparing inquiries to be submitted to an member to be inquired, in accordance with job specifications of the member to be inquired. Inquiries are changed in accordance with job specifications of a member to be inquired for acquiring useful answers, as determined by the inquiry preparation means 12 of the appraisal device 10.

A variety of inquiries are stored beforehand in storage means 24 provided in the security policy draft preparation apparatus 20, as in the case of the storage means 14 shown in FIG. 2. The inquiry preparation means 22 extracts appropriate inquiries from the storage means 24 in accordance with job specifications of a member.

The security policy draft preparation apparatus 20 is further equipped with answer archival storage means 26. The answer archival storage means 26 stores answers into the storage means 24, as does the answer archival storage means 16. Further, the answer archival storage means 26 has an answer integration function.

Integration Function

An integration function includes the following features:

(1) A plurality of systems engineers separately conduct interviews with individual members and collect the resultant answers. For instance, if a plurality of systems engineers conduct an interview with a single member, the resultant answers are integrated into a single database. More specifically, a series of inquiries of the same type are submitted to a plurality of members, and the resultant answers are integrated into a single database.

(2) There may be a case where a single inquiry is submitted to different members through interviews. In such a case, a contradiction may arise in answers. There are two measures to eliminate the contradiction. A first measure is a re-interview. In the event that respondents have submitted incorrect answers with regard to the contradiction, it is thought that such a contradiction can be resolved by means of conducting a re-interview or inspection (or both). A second measure is to determine answers by means of assigning weights to answers in accordance with the types (job specifications) of the members.

In the present embodiment, the user can freely select either the first measure or the second measure.

The security policy draft preparation apparatus 20 has draft preparation means 28 for preparing a security policy draft. The draft preparation means 28 prepares a security policy on the basis of the group of answers stored in the storage means 24.

The security policy draft preparation apparatus 20 is a so-called expert system, as is the appraisal device 10. In fact, the previously-described individual means are preferably embodied as software which is executed on a computer.

Figure 5:
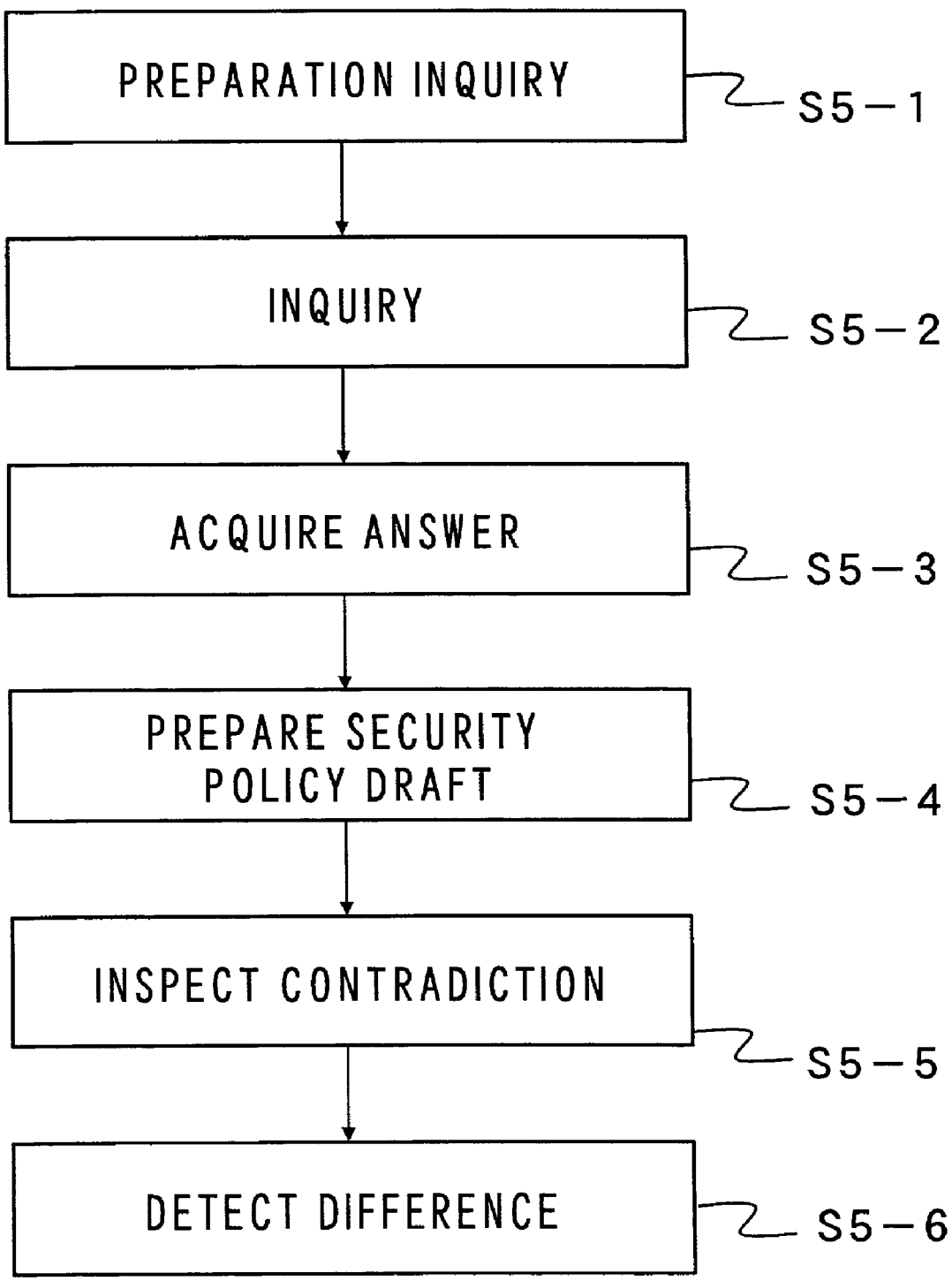
FIG. 5 is a flowchart showing establishment of a security policy draft through use of a security policy draft establishment apparatus.

By reference to a flowchart shown in FIG. 5, there will be described an operation for preparing a security policy draft. FIG. 5 shows a flowchart representing an operation for preparing a security policy draft through use of the security policy draft preparation apparatus 20.

In step S5-1, job specifications of members who are to be inquired are supplied to the inquiry preparation means 22, and inquiries are submitted to the members.

As set forth, in the first embodiment, inquiries to be prepared are determined in accordance with job specifications of the members. Consequently, appropriate inquiries to be submitted to members to be inquired can be prepared.

A so-called course of inquiries is determined in accordance with job specifications of a member. Actual inquiries to be submitted in each course are changed in response to an answer submitted by a member. For example, if in response to an inquiry about use of VPN a member has answered that VPN is not used, detailed inquiries about VPN are skipped. In contrast, if the member has answered that VPN is used, detailed inquiries about VPN are submitted to the member.

Such a control operation is implemented by utilization of, a so-called knowledge-based expert system.

In step S5-2, the thus-prepared inquiries are submitted to members.

In step S5-3, answers to the inquiries are submitted by the members, and the answers are entered to the answer archival storage means 26 of the security policy draft preparation apparatus 20. Preferably, the answers are entered by the interviewers. As a matter of course, there may be employed a form in which individual members answer inquiries by way of a screen of the policy draft preparation apparatus 20. The answer archival storage means 26 has an answer integration function, as mentioned above, and integrates answers acquired by a plurality of interviewers into a single database and stores the single database into the storage means 24.

In step S5-4, on the basis of the group of answers stored in the storage means 24, the draft preparation means 28 prepares a security policy draft by combination of various principles extracted from the global guidelines.

As set forth, a security policy draft is prepared through use of the security policy draft preparation apparatus 20.

In the first embodiment, there are prepared three levels of (drafts of) security policy: that is, an executive-level security policy (draft), a corporate-level security policy (draft), and a product-level security policy (draft). These three levels of security policy drafts will be described later in section B-5.

B-1: Inquiries (for an interview)

Inquiries (often called an "interview") will be described hereinbelow.

Headings of an interview are as follows:
1. Organization
2. Network
3. Server and host
4. Application and database
5. Security items of great importance
6. Other security Items Individual headings will now be described.

(1) Organization

In connection with heading "organization" an interview is conducted for the outline and system of an "organization". From answers to the inquiries, there can be derived an information security administration system, policy principles, and analysis of vulnerability (analysis of differences).

Heading "organization" is followed by the following sub-headings.
1.1 Management system
1.2 Employees
1.3 Outline of enterprise
1.4 Venders
1.5 Clients
1.6 Consultants
1.7 Outsourcing
1.8 Application
1.9 Network
1.10 Security profile
1.11 Business category
1.12 Organization policy Inquiry headings may change according to job specifications. For instance, inquiry heading "host" is not provided for a chief executive officer. Thus, the present embodiment is characterized in that inquiries change according to job specifications. Thus, inquiries tailored to job specifications can be submitted to a member, thus enabling efficient conduct of an interview.

(2) Network

In connection with heading "network," inquiries about the outline, operation, and settings of a network are submitted through an interview. From answers to these inquiries, there can be derived the vulnerability of the network, a corporate-level policy pertaining to the network, or the like.

Heading "network" is followed by the following sub-headings.
2.1 Operation environment
2.2 Network properties
2.3 Authentication and identification
2.4 Audit and logs
2.5 Access control
2.6 Modification procedures
2.7 Disaster recovery
2.8 Operation reliability
2.9 Physical security
2.10 Modem
2.11 Workstation security (3) Server and Host In connection with heading "server and host," inquiries about the outline, operation, and settings of a host are submitted through an interview. From answers to the inquiries, there are derived the weakness of a host and a corporate-level policy pertaining to a host and a server.

Heading "server and host" is followed by the following sub-headings.
3.1 Properties of server and host
3.2 Authentication and identification
3.3 Audit and logs
3.4 Access control
3.5 Modification procedures
3.6 Disaster recovery and back-up
3.7 Operation reliability
3.8 Physical security (4) Application and database In connection with heading "application and database," inquiries about the outline, operation, and settings of an application are submitted through an interview. From answers to the inquiries, there are derived the vulnerability of an application and a corporate-level policy pertaining to an application.

Heading "application and database" is followed by the following sub-headings.
4.1 Properties of application and database
4.2 Authentication and identification 4.3 Audit and logs
4.4 Access control
4.5 Modification procedures
4.6 Disaster recovery and back-up
4.7 Operation reliability
4.8 Physical security (5) Security items of great importance In connection with heading "security items of great importance" inquiries about information usually required for establishing a firewall are submitted through an interview. From answers to the inquiries, there are derived a corporate-level policy and a product-level policy.

Heading "security items of great importance" is followed by the following sub-headings.

5.1 Management of firewall
5.2 Packet filtering
5.3 NAT (network address transfer)
5.4 SMTP content filtering
5.5 FTP content filtering
5.6 HTTP content filtering
5.7 Logs and alert (6) Other Security Items In connection with heading "other security items" inquiries about information usually required for establishing VPN are submitted through an interview. From answers to the inquiries, there are derived a corporate-level policy and a product-level policy.

Heading "other security items" is followed by the following sub-headings.

6.1 VPN properties
6.2 VPN management
6.3 Key delivery
6.4 Logs and audit

B-2 Interview Style

Contents of an interview are as set forth, and the interview is conducted in any of various forms, such as a description form or a multiple-choice.

B-3 Interviewee

The security policy draft preparation apparatus 20 according to the first embodiment changes inquiries according to a member who is an interviewee. In short, inquiries are controlled according to job specifications of an interviewee.

Consequently, appropriate inquiries to be submitted to an interviewee can be prepared.

In more detail, a so-called course of inquiries is determined in accordance with job specifications of a member. Inquiries to be submitted in each course are changed in response to an answer submitted by a member. For example, if in response to an inquiry about use of VPN a member has answered that VPN is not used, detailed inquiries about VPN are skipped. In contrast, if the member has answered that VPN is used, detailed inquiries about VPN are submitted to the member.

Such a control operation is implemented by utilization of a so-called knowledge-based expert system.

Prior to conduct of an actual interview, job specifications of an interviewee must be entered into the security policy preparation apparatus 20. More specifically, data pertaining to the following entries are input.

* Name
* Department
* Title
Postal Code
Address
Country
Phone Number
E-mail Address
*Type Of these entries, entries prefixed by asterisks are required entries. Here, the expression "type" denotes a symbol representing a job specification. In the present embodiment, symbols shown in FIG. 6 are used for expressing a job specification. Simply put, the "type" denotes a job specification. Inquiries to be submitted are determined on the basis of a type. A listing of types to be handled in the present embodiment is shown in FIG. 6.

Inquiries which are actually submitted to an interviewee change according to answers. Such control of inquiries is performed on the basis of a knowledge-based operation. For instance, an inquiry about an "expiration date of a password" is not submitted to members who have answered that no expiration is imposed on a password in response to an inquiry as to whether or not an expiration data is set for a password. In contrast, an inquiry about an expiration date of a password may be submitted to members who have answered that an expiration date is set for a password.

B-4 Information Assets to be Managed

In the first embodiment, information assets for which security must be ensured are classified into five categories; namely, network, host, application, user group, and others. In a case where information assets are entered into the security policy draft preparation apparatus 20 according to the present embodiment, data pertaining to the following four entries are to be input. Here, in a case where information assets belong to either category "host" or category "network," data pertaining to two additional entries; i.e., "IP address" and "sub-net mask," are to be entered.

Asset ID
*Asset type
*Name of asset
Details

Of these entries, entry "asset type" covers five types.

A application
H Host
N Network
U User group
W Others, including URL, domain names, and file names The expression "user group" designates a logical set of users possessing a common characteristic. For example, users who handle, amend, analyze, and report accounting information are collectively called a "accounting group." Each user group is formed from one user or two or more users. The word "user" designates a human who uses information assets.

B-5 Preparation of Security Policy Draft

A security policy is established by means of entering into the security policy draft preparation apparatus 20 answers to the foregoing inquiries. This device is a so-called expert system. By means of entry of answers to inquiries into a system, the system produces and outputs a security policy. Such a device which produces data of some kind in response to entry of answers to inquiries has already been known as an expert system, and hence its detailed explanation is omitted.

In the first embodiment, three levels of security policies are produced; i.e., an executive-level security policy, a corporate-level security policy, and a product-level security policy. Similarly, there are prepared three levels of security policy drafts corresponding to the respective security policies.

(1) Executive-level Security Policy

An executive-level security policy consists of descriptions of the organization's "concept" and "policy" concerning security.

An executive-level policy includes the following items.

Access Control

An owner of information assets must manage and control the right to access information assets. In order to implement control of the access right, an access control mechanism of a control system used for preserving or processing information assets must be used. Item "access control" describes the organization's concept and policy concerning control of the access right.

Accuracy of Information

It is extremely important to maintain the contents of information assets accurately as it is. Because information assets is indispensable for making business decisions. Item "accuracy of information" describes the organization's concept and policy concerning the guarantee of accuracy of information assets content.

Guarantee

An organization must employ appropriate measures to ensure suitable safety of information resources or security. Item "guarantee" describes the organization's concept and policy concerning measures to ensure safety.

Accountability

All systems must enable recording and analysis of user activities, and an individual user must have responsibility for his own acts. Item "accountability" describes the organization's concept and policy concerning personal responsibility of an individual user.

Identification and Verification

All users must be appropriately identified in accordance with the security level of information assets. Items "identification and verification" used herein describe the organization's concept and policy concerning such identification.

Emergency Response Plan

An organization must prepare a detailed plan and procedures for ensuring appropriate response to obstacle in a system and a network. Item "emergency response plan" describes the organization's concept and policy concerning a plan and procedures for response to an emergency.

Awareness of Security

Top executives and other employees must become conscious of requirements for the organization's information security, as well as of their personal responsibility. Item "awareness of security" describes the organization's concept and policy concerning personal responsibility.

Categorization of Information

Information security is for protecting information assets. For this reason, information assets which are objects of protection must be categorized and appropriately protected according to categories. Item "categorization of information" describes the organization's concept and policy concerning information assets.

Vocational Ethics

A user must obey the determined rule for action and handle information assets ethically. In the event a user handles information assets without ethic, breaks a law and rule, or handles information assets for his private benefit, the user will be subjected to sanction. In short, the user must be conscious that he may be subjected to sanction. Item "vocational ethics" describes the organization's concept and policy concerning the rule for action a user must obey.

Document Management

All security systems must be appropriately recorded in documents and referred according to necessity. Item "document management" describes the organization's concept and policy concerning documentation.

Investigation

In the event of obstacle or violation, the organization must investigate the obstacle and violation and records their details in documents according to security policy. Item "investigation" describes the organization's concept and policy concerning investigation and documentation of obstacle and violation.

Privacy

Information assets is to be used on the precondition that the privacy of concerned members is guaranteed. Item "privacy" describes the organization's concept and policy concerning privacy.

Risk Management

An owner of information assets must evaluate potential risks and take appropriate measures to control and protect information. Item "risk management" describes the organization's concept and policy concerning evaluation of risks and measures to control and protect information.

Verification

An organization must periodically verify implementation of security. Item "verification" describes the organization's concept and policy concerning verification of security.

Asset Assessment

An organization must analyze its information assets. Item "asset assessment" describes the organization's concept and policy concerning assessment of assets.

Security Management

An organization must manages security policy properly and revises the security policy when amendment or improvement are necessary. Item "Security Management" describes the organization's concept and policy concerning Security management.

(2) Corporate-level Policy

With regard to information assets of an organization, descriptions of the executive-level policy are applied to a corporate-level policy. The corporate-level policy corresponds to descriptions of "operating procedures." The corporate-level policy is applied to each operating unit of the organization. Operating units are formed by means of dividing constituent elements of an information system into groups according to function. For example, a network, a host, and an application are operating units.

The executive-level policy describes the so-called "constitution" (dominant principles)" whereas the corporate-level policy describes "laws" (rules based on the dominant principle).

The corporate-level security policy describes standards for the information security system of the overall organization; and standards for individual equipment constituting the information security system of the organization.

At first, the corporate-level security policy is a policy concerning all operating units which constitute the organization. For example, regulations are described for each operating unit.

Network

Item "network" describes regulations concerning the entire network of the organization.

Host

Item "host" describes regulations concerning all hosts provided in the organization.

Application

Item "application" describes regulations concerning all applications employed in the organization.

Secondary, the corporate-level security policy describes individual units into which the operating units are further sub-divided. For example, the corporate-level security policy comprises descriptions pertaining to the following items.

Software Management

Item "software management" describes regulations with regard to use of software in the organization and management of software licenses.

Dial-Up

Item "dial-up" describes regulations with regard to individual dial-up and remote access servers employed in the organization.

Electronic Mail

Item "electronic mail" describes regulations with regard to individual E-mails accounts and messages in the organization.

Firewall Management

Item "firewall management" describes regulations with regard to management of individual firewalls used in the organization.

Cryptography

Item "cryptography" describes regulations with regard to implementation of individual cryptographic tools used in an organization.

Electronic Commerce

Item "electronic commerce" describes regulations with regard to electronic transactions used in the organization.

Network

Item "network" describes regulations with regard to implementation individual networks employed in the organization.

Host

Item "host" describes regulations with regard to implementation of individual hosts used in the organization.

Application

Item "application" describes regulations with regard to individual applications used in the organization.

(3) Product-level Policy

A product-level policy describes specific "operating procedure including methods" to be used for protecting information assets and the nature of resources (security products and operating systems) and settings thereof. The executive-level policy describes a policy and management rules, whereas the product-level policy refers to details of hardware and software. On the basis of the "principles" provided by the executive-level policy and the "specifications" provided by the corporate-level policy, there is provided a specific "method" for embodying protection of information assets. Hence, the product-level policy includes descriptions regarding implementation of specific technology.

The product-level policy includes descriptions about software and hardware, as well as specific rules for operating software and hardware.

For reasons of actual job performance, there may be a case where products to be used are changed. And alternate equipment maybe used for reasons of equipment failure. Liability for such circumstances or product standards is left to the "principles" stipulated in the executive-level policy or to the "regulations" stipulated in the corporate-level policy. In other words, the executive-level policy or the corporate-level policy must sufficiently specify measures against these circumstances.

So to speak, the previously-described executive-level policy states the principle; for example, a rule about a necessity for revoking an access right after completion of a job requiring the access right.

The corporate-level policy states specific rules; for example, a rule about a necessity for controlling access by means of an operating system.

In contrast, the product-level policy stipulates specific means; for example, a stipulation stating that "Access control rule for server A is only a member who has an authorization greater or equal to Chief of Section in department B can access the Server A."

Other example is "Administrator X controls an access to server A. A member who requires access to server A for business must request administrator X to issue an access right. After completion of the job, the member immediately requests administrator X to revoke the access right."

In the present embodiment, there are two product-level policies.

A first-level product policy describes settings of individual equipment constituting the information security system in natural language, as are the executive-level policy and the corporate-level policy. The foregoing examples belong to the first-level product-level policy.

A second-level product policy describes settings of individual equipment constituting the information security system in specific language used in specific equipment. In other words, a second-level product policy is a script file stating settings of specific systems. More specifically, the second-level product-level policy describes a setting script file of an individual system (including both hardware and software). Therefore, the second-level product-level policy can be used for setting a system, in its present form. In the present embodiment, a specific script file of an individual system is prepared as a product-level security policy. Accordingly, there are yielded an advantage of alleviating labor required for actually setting firewalls or routers.

Next, there is examined and analyzed a difference existing between the thus-prepared security policy draft, realities of an information system, and a method of operating the information system. Inspection and analysis to be performed are made up of the following.

A security policy draft is prepared on the basis of inquiries and answers thereto. In this process, variations or contradiction between answers may arise. Moreover, answers are not necessarily correct.

For these reasons, the following operations are performed during inspection and analysis.

First, answers are examined as to whether or not contradiction arises among a plurality of answers. Further, there is performed a comparison between the security policy draft and an information system depicted from answers acquired by means of interviews. A comparison is made between the security policy draft and the actual information system which has been verified through inspection, thereby detecting a difference.

Figure 7:
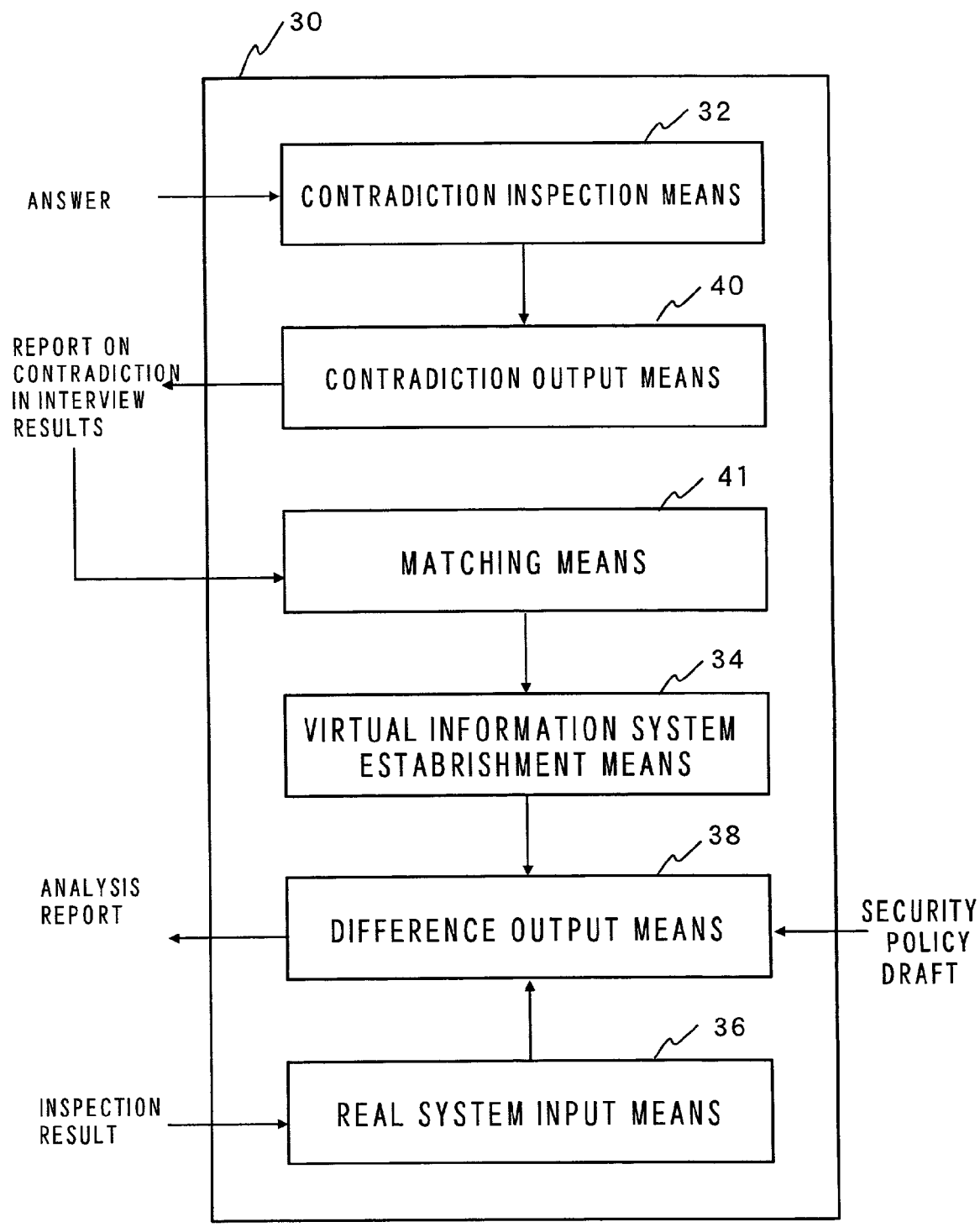
FIG. 7 is a block diagram showing the configuration of an analyzer.

An information system is actually inspected through use of an analyzer, which is an expert system. FIG. 7 is a block diagram showing the configuration of an analyzer 30. As can be seen from the drawing, the analyzer 30 has contradiction inspection means 32 for inspecting whether or not contradiction arises in a group of answers. An inspection result is supplied to contradiction output means 40.

The contradiction output means 40 outputs the inspection result to the outside in the form of an interview result contradiction report.

Contents of the interview result contradiction report are supplied to matching means 41. In a case where a contradiction between answers is found, the matching means 41 performs the operation that the user selects from the two operations provided below.

(1) On the basis of job specifications of the members, the most probable answer is estimated and displayed before the user. The User can adopt the estimated probable answer.

(2) An interview is conducted again with regard to a contradiction, or realities of the information system are actually investigated. Alternatively, both conduct of a re-interview and actual inspection of an information system are desirably performed.

Matched results (i.e., answers obtained as a result) of the interview are supplied to a virtual information system establishment means 34.

On the basis of a group of matched answers, the virtual information system establishment means 34 virtually establishes an information system for the organization. The configuration and operation of the information system established by the virtual information system establishment means 34 are supplied to difference output means 38.

The analyzer 30 has real system input means 36 for entering the configuration and operation of an actual information system of the organization. The configuration and operation of a real system entered by way of the real system input means 38 are supplied to the difference output means 38.

As mentioned above, the virtual information system is established on the basis of only interview results. Therefore, so long as the virtual information system which has been verified through use of an actual information system is compared with a security policy draft, points of the actual information system which are to be amended can be ascertained more clearly.

The more accurate an actual inspection conducted for the purpose of verification, the more preferable an inspection result. Investigation of the entire information system consumes much time and effort and makes interviews meaningless.

For these reasons, investigation of an actual information system is performed as a supplement to the answers obtained through the interviews. An efficient way of attaining this is to verify the virtual information system and analyze a difference between the thus-verified information system and the security policy.

For example, emphasizing investigation of a contradiction between answers is preferable. An alternative is emphasizing investigation of an inquiry for which a member (i.e., interviewee) could not answer due to forgetfulness.

The extent to which an investigation is to be performed should be determined on the basis of a required accuracy, time limit, and costs. The thus-determined difference is output as an analysis report.

Further, a security policy draft is supplied to the difference output means 38. By means of the foregoing configuration, the difference output means 38 performs the following two comparison operations, thereby detecting and outputting respective differences.

(1) Analysis of a difference between a security policy draft and the result of an interview.

(2) Analysis of a difference between a security policy and an interview result which has been verified by means of actual inspection.

Through analysis of a difference stated in (1), a security policy draft is compared with the information system established by the virtual information system establishment means 34. Both the security policy draft and the information system are prepared on the basis of results (answers obtained as a result) of interviews conducted with the members. Therefore, it is possible that no substantial difference is found as a result of comparison.

For example, it will be possible that answers to interviews state that "a password is unlimitedly valid". But, the security policy is not allowed to make a password unlimitedly valid. Expiration of a password is a fundamental requirement of the security policy. A security policy without such a requirement does not merit being called a security policy.

For this reason, a difference can exist between a security policy draft and interview results. A detected difference is output as an analysis report.

By means of this analysis report, portions of interview results which are to be amended in terms of security policy can be found.

During analysis of a difference stated in (2), a security policy draft is compared with the established virtual information system which has been verified by means of actual inspection.

Either comparison (1) or (2) or both may be performed. Preferably, if an insufficient result is obtained as a result of implementation of comparison (1), comparison (2) is performed.

Preferably, higher-priority portions are subjected to actual inspection, in consideration of the priority determined as a result of step 2 (S1-2 in FIG. 1) inspection and analysis to be described later.

FIG. 5 shows a flowchart representing processing pertaining to step 2. The flowchart shows in more detail processing pertaining to step S1-2 shown in FIG. 1.

In step S5-5, an inspection is performed as to whether or not answers include only contradiction, through use of the contradiction inspection means 32. In step S5-6, an inspection is performed as to whether or not a difference exists between a security policy draft and interview results, through use of the difference output means 38. Here, the interview results comprise a virtual information system established on the basis of answers to interviews and the virtual information system which has been verified by means of actual inspection of a real information system.

As mentioned above, according to the present embodiment, since the analyzer 30 shown in FIG. 7 is employed, the user can immediately become aware of whether or not answers include a contradiction or whether or not a difference exists between answers and a real information system.

Here, the analyzer 30 is a so-called expert system. Further, the previously-described means are preferably implemented by software which runs on a computer.

C. Step 3: System, and Actual Inspection and Analysis of operation of the System Actual Inspection and Analysis Through actual inspection and analysis, a difference obtained in step S1-2 (FIG. 1) actual inspection and analysis is classified into one of three categories; that is, a difference in member assignment, a difference in operating method, and a difference in technical measures. For each of the three types of difference, countermeasures and priority are analyzed.

Example measures for a case where a difference in network policies and the priority of the measures will be described.

(1) Difference 1

Type of Difference: Difference in personnel assignment

Details: The network policy states that an administrator of each network segment is to be clearly designated. However, network segment administrators are not clearly designated in a real information system.

Measures: Administrators or owners are clearly allocated to respective network segments.

Priority: Immediately (2) Difference 2

Type of Difference: Difference in technical measures

Details: The network policy states that if a password to be used for user authentication in a network has not been used for a long period of time, the password should be deleted. However, the real information system has no system for deleting such a password.

Measures: Establish a system for deleting a password assigned to a user account which has not been used for 30 days.

Priority: High

As mentioned above, the first embodiment facilitates devising of measures for eliminating a difference between answers given in interviews and the real information system. Accordingly, a discrepancy between a security policy and the real information system is easily eliminated.

D Step 4: Adjustment of Policy and Rules

In step 3, the discrepancy between the real information system and the security policy draft is clarified, and measures for eliminating the discrepancy and the priority of the measures are also made clear. In step 4, measures and actual work are examined.

Measures are roughly classified into two categories.

(1) Adjust the security policy draft so as to match the real information system.

(2) Adjust operation rules of the real information system.

These measures will now be described in detail.

D-1 Adjustment of Security Policy Draft

As has been described, the security policy draft is called a set of global guidelines. The security policy draft is prepared by means of appropriate combination of basic items and contents for establishing a standard security policy. Several types of global guidelines have already been known. In the first embodiment, rules and policies are extracted from the global guidelines, as required, and a security policy is drafted by use of the thus-extracted rules and polices in combination. In the drafting phase, the most rigorous global guide line is selected from several types of global guideline, and the thus-selected guideline is taken into a security policy draft.

Thus, in terms of severity of a rule, global guide lines differ from each other according to type. For example, a certain global guide line defines a password as being valid for 60 days, whereas another global guideline defines a password as being valid 180 days.

In the drafting phase, individual rules are defined so as to comply with the most rigorous requirements. Some of organizations may consider that rules of a security policy draft are unacceptably rigorous. In such a case, the rules are preferably changed to less rigorous rules.

In a case where a rule for defining a single password as being valid for 60 days is considered to be unacceptably rigorous, the duration of validation of a password is changed to 180 days after discussions with the organization. Thus, a rigorous rule is changed to a less rigorous rule.

In this way, so long as the severity of each rule is changed in consideration of the result of comparison organization's intent and rigorousness of the rule, a security policy matching a real information system can be established.

A security policy draft is adjusted in the manner as mentioned above.

D-2 Adjustment of Rules

On the basis of the measures described in connection with level-2 inspection and analysis, operation rules of the real information system are adjusted. Adjustment of rules means modifications to an operating method and modifications to rule settings of a security system (e.g., a firewall).

E Step 5: Priority Planning

Establishment of a security policy for the real information system of an organization is completed by step 4.

Security measures must be sequentially performed in accordance with the thus-established security policy. In step 5, measures are examined in consideration of priority and are described in a list. Preparation of such a list enables planning of future security measures, and a budget can also be examined on the basis of the plan. Without such a list, forecasting costs for future information security would be difficult, thus imposing difficulty in drawing up a budget.

Security measures include training for compelling members to respect a security policy and analysis of system logs as well as introduction and testing of a security system.

A security policy includes monitoring of a network, auditing of operations on the basis of a security policy, and review of a security policy.

There may be a case where a security policy must be modified in accordance with a change in the organization's information system or a change in the operation of an information system. For this reason, the security policy must be reviewed periodically.

F Step 6: Implementation of Security Enhancement Measures

On the basis of the security measures list which has been prepared in step 5 in consideration of priority, security enhancement measures are actually implemented. Security enhancement measures can be smoothly implemented in accordance with the list and the security policy.

In the first embodiment, processing from establishment of a security policy to maintenance thereof is performed in six steps. Therefore, a security policy can be established and implemented stepwise and can be implemented in consideration of organization's desires.

Second Embodiment

Consideration of Field of Business

The first embodiment has described an example in which inquiries are changed in accordance with job specifications of members belonging to an organization. However, no particular consideration is paid to the field of business of an organization.

For instance, a security policy to be established in an organization in the financial industry differs from that to be established in an organization in the manufacturing industry.

For this reason, in the second embodiment, establishment of a security policy in consideration of the field of business of an organization is put forward.

The security policy draft preparation apparatus 20 shown in FIG. 4 changes inquiries in accordance with job specifications of a member. In addition to changes in inquiries, in the second embodiment there will be described a case in which inquiries are changed in accordance with the field of business of an organization.

Figure 9:
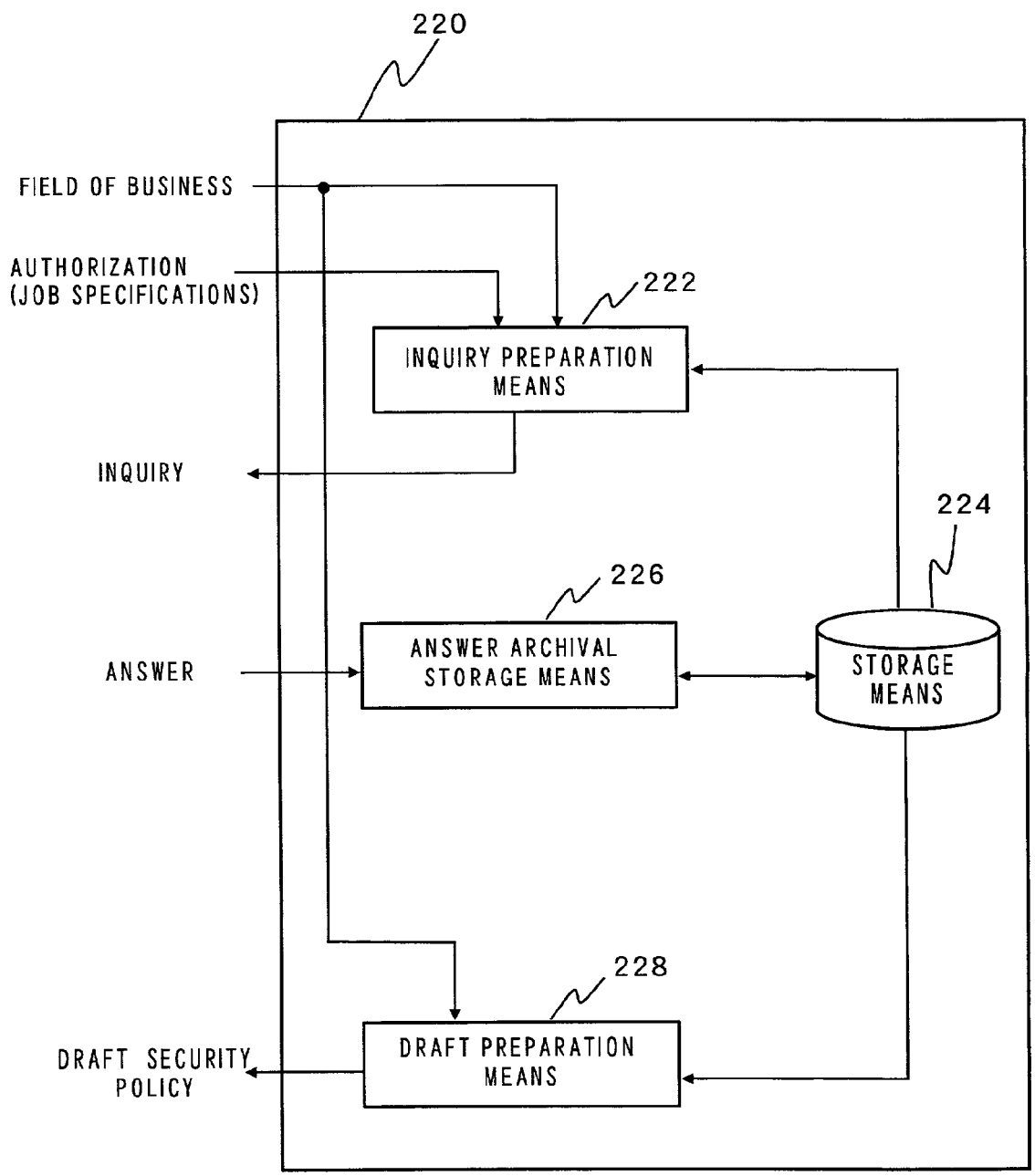
FIG. 9 is a block diagram showing the configuration of a security policy draft preparation apparatus according to a third embodiment of the present invention.

FIG. 9 is a block diagram showing the configuration of a security policy draft establishment device 120 according to a second embodiment of the present invention.

The security policy draft establishment device 120 is substantially identical with the security policy draft establishment device 20 shown in FIG. 4.

One of differences between the security policy draft establishment devices 20 and 120 lies in that the security policy draft establishment device 120 has inquiry preparation means 122 for preparing inquiries on the basis of the field of business of an organization to which members to be interviewed belong.

Inquiries which vary according to field of business are stored in storage means 124 before hand. On the basis of an entered field of business, the inquiry preparation means 122 reads from the storage means 124 inquiries corresponding to the field of business.

Answer archival storage means 126 operates in substantially the same manner as does the answer archival storage means 26 shown in FIG. 4.

This configuration enables establishment of a more elaborate security policy by means of preparing inquiries corresponding to the field of business of the organization.

For instance, an inquiry stating "How is a depositor list managed?" is to be prepared for an organization pertaining to the financial industry. However, generation of this inquiry for an organization belonging to the manufacturing industry is meaningless. Conversely, an inquiry stating "How is progression data pertaining to each manufacturing lot managed?" is to be prepared for an organization belonging to the manufacturing industry. However, generation of this inquiry for an organization belonging to the financial industry is meaningless.

Consequently, in the second embodiment, inquiries are changed according to the field of business of an organization, and more detailed inquiries can be made, so that details of an organization's information system (including operation and management of the system) can be ascertained more thoroughly.

Here, a change in inquiries means a change in a course of inquiries, as in the case of job specifications. More specifically, a course including inquiries aimed at the financial industry is applied to an organization belonging to the financial industry. Further, a menu including inquiries aimed at the manufacturing industry is applied to an organization belonging to the manufacturing industry. In each course, the next inquiry to be submitted is changed in accordance with the answer submitted by a member in response to the preceding inquiry, as in the case of the first embodiment.

A draft preparation means 128 shown in FIG. 9 is essentially identical with the draft preparation means 28 shown in FIG. 4. On the basis of answers responding to more detailed inquiries prepared by the inquiry preparation means 122, the draft preparation means 128 prepares a security policy draft. Consequently, as mentioned previously, a more detailed security policy draft can be prepared.

Operation required for preparing a security policy draft according to the second embodiment is substantially identical with that described in the flowchart shown in FIG. 5.

A difference between the operation employed in the second embodiment and that described in connection with the first embodiment lies in that in step S5-1 the field of business of an organization is supplied to the inquiry preparation means 122, as in the case of job specifications of a member. As a result, the inquiry preparation means 122 can prepare appropriate inquiries on the basis of the job specifications of members and the field of business of an organization.

In the second embodiment, inquiries are prepared in consideration of the field of business of an organization. Hence, an organization's information security system can be ascertained in more detail through an interview. Consequently, establishment of a more detailed security policy becomes feasible.

Although the above description has described an example in which inquiries are changed according to the field of business of an organization, inquiries may be changed according to the scale of an organization.

In the above description, a change in the course of inquiries has been taken as an example change in inquiries. However, methods of other types can be employed. For instance, it is desirable to have determined a basic framework of inquiry statements in advance and to change terms in the inquiry statements in compliance with the field of business of an organization. More specifically, there is a conceivable method in which, although "president" is used in inquiry statements aimed at general corporations, the term "president" is switched to "bank president" in the case of an inquiry statement being made to a bank.

Third Embodiment

Consideration of Recommendations and Regulations in a Specific Industry

In the example described in connection with the first embodiment, a security policy is established on the basis of global guidelines (step S5-4). In many cases, global guidelines are prepared in consideration of a specific objective. However, the global guidelines are generally constructed so that they may be used for general purpose.

In contrast to these general-purpose global guidelines, recommendations and regulations within a specific industry are known. In contrast with global guidelines, the recommendations and regulations clearly state that they are aimed at a specific industry. There are many cases where recommendations and regulations refer to information security, and utilization of recommendations and regulations during establishment of a security policy as in the case of global guidelines is desirable.

For example, Japanese FISC (The Center for Financial Industry Information Systems) lays down safety provisions and prevalence of a security policy for ensuring security. FISC publishes a journal titled "Safety Provision Standards for Computer Systems in Financial Institutions."

In a third (this) embodiment, when a security policy aimed at the financial industry is established, there is proposed establishment of a security policy on the basis of "Safety Provision Standards for Computer Systems in Financial Institutions" as well as on the basis of global guidelines. As a result, in the field of a specific industry, a security policy for the industry is established on the basis of recommendations and regulations focused on the industry. Hence, establishment of a more elaborate security policy becomes feasible.

Figure 8:
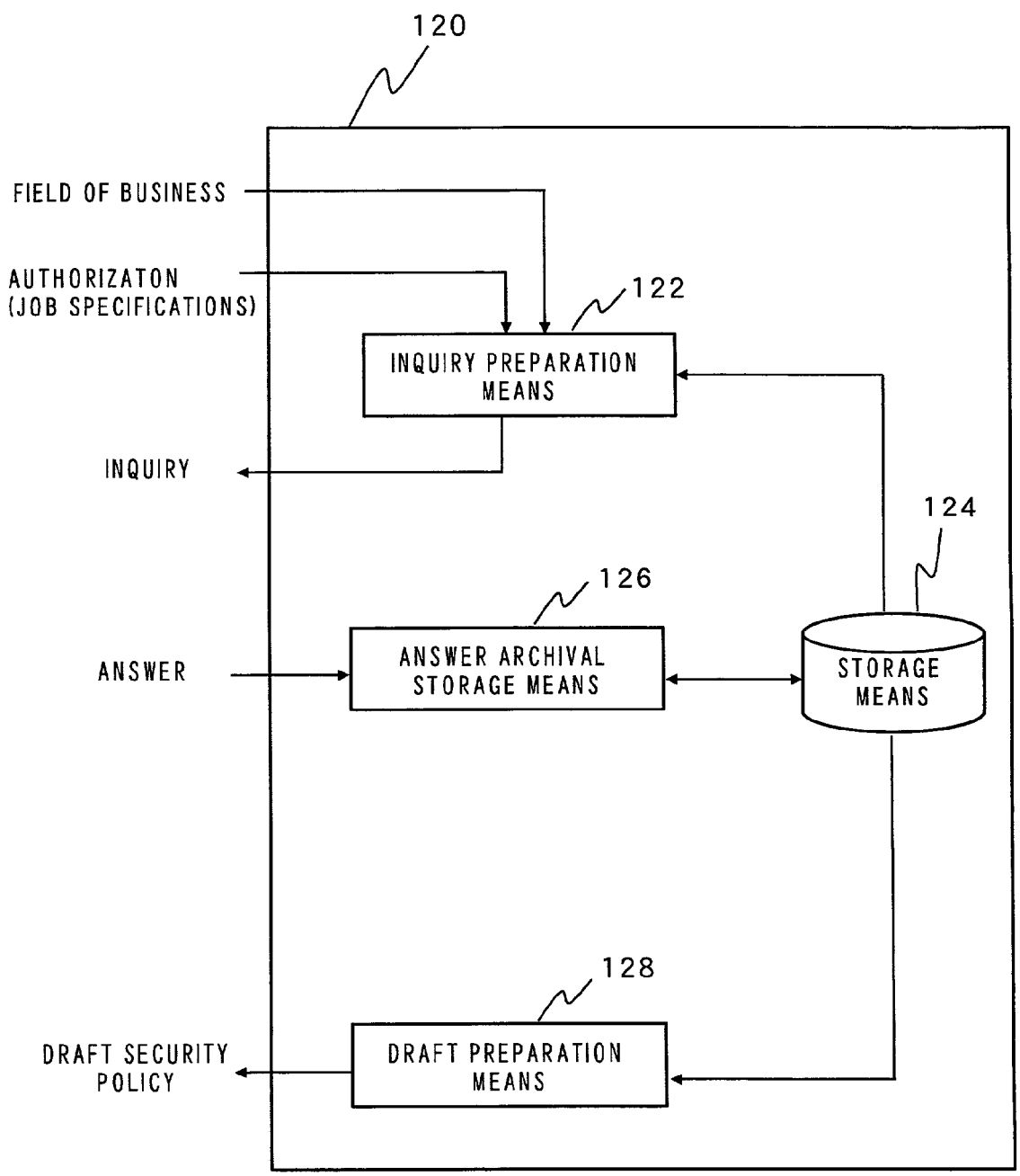
FIG. 8 is a block diagram showing the configuration of a security policy draft preparation apparatus according to a second embodiment of the present invention.

The security policy draft preparation apparatus which utilizes recommendations and regulations aimed at a specific industry shown in FIG. 9 in connection with the third embodiment. FIG. 9 is a block diagram showing the configuration of a security policy draft preparation apparatus 220 according to the third embodiment. As illustrated, the security policy draft preparation apparatus 220 is substantially identical in configuration with the security policy draft preparation apparatus 120 shown in FIG. 8. The difference between them lies in that information concerning the field of business of an organization is supplied to draft preparation means 228 as well as to inquiry preparation means 222. On the basis of the field of business of an organization, the draft preparation means 228 selects global guidelines to be used for preparing a security policy draft. The number of global guidelines to be selected is not limited to one; there may be a case where two or more global guidelines maybe selected. Furthermore, the construction shown in FIG. 9 has features as follows.

First, a point of novelty of the third embodiment lies in that recommendations and regulations which are aimed at a specific industry and are to be displayed before the users. The users can select any recommendations and regulations on the basis of the industry of an organization. For example, in the field of the financial industry, preparation of a security policy (draft) utilizing recommendations and regulations aimed at the financial industry becomes feasible through the foregoing operations.

Second, information concerning recommendations and regulations aimed at a specific industry is stored in a storage means 224 in the same manner as is information concerning global guidelines. By means of the thus-stored information, the inquiry preparation means 222 can prepare inquiries in compliance with the recommendations and regulations established for the industry to which an organization pertains. In accordance with the thus-stored information, the draft preparation means 228 enables establishment of a security policy on the basis of the recommendations and regulations established for the industry to which an organization pertains.

Operation required for preparing a security policy draft according to the third embodiment is essentially identical with that described in connection with the flowchart shown in FIG. 5. Differences are as follows:

First, instep S5-1 the field of business of an organization is supplied to the inquiry preparation means 222, and inquiries complying with the recommendations and regulations aimed at the industry to which an organization pertains are prepared. If the user didn't select the such recommendations or regulations displayed, then inquiries are prepared on the basis of global guidelines, as in the case of the first through second embodiments. And, if such recommendations or regulations are not present, inquiries are prepared on the basis of global guidelines, as in the case of the first through second embodiments, too.

Second, instep S5-4 the field of business of an organization is supplied also to the draft preparation means 228. The draft preparation means 228 prepares a security policy draft in compliance with the recommendations and regulations aimed at the industry to which the organization pertains. If the user didn't select such recommendations or regulations displayed, a security policy draft is prepared on the basis of global guidelines, as in the case of the first through second embodiments. And, if such recommendations or regulations are not present, a security policy draft is prepared on the basis of global guidelines, as in the case of the first through second embodiments, too.

For example, an inquiry stating "Do you have personnel responsible for a trunk network?" is prepared in accordance with global guidelines. However, particularly in the case of the financial industry, an inquiry stating "Do you have personnel responsible for an ATM (automatic teller machine) network" is prepared in accordance with the "Safety Provision Standards for Computer Systems in Financial Institutions" set forth.

Such an inquiry is prepared by means of the technique of "changing an inquiry according to field of business" mentioned in connection with the second embodiment. For example, if the field of business of an organization is the financial industry, an inquiry complying with the "Safety Provision Standards for Computer Systems in Financial Institutions" is prepared and used for an interview. An expert system which prepares such an inquiry can be configured, by means of utilizing knowledge-based information including information about the "Safety Provision Standards for Computer Systems in Financial Institutions."

Establishment of a security policy by use of such a technique enables establishment of a more elaborate security policy.

Overlap Between Items

In connection with items which do not appear in global guidelines and appear in only the recommendations and regulations aimed at a specific industry, it goes without saying that a security policy is established on the basis of the recommendations and regulations.

Conversely, in connection with items which appear in only global guidelines and not in the recommendations and regulations aimed at a specific industry, a security policy is established on the basis of global guidelines, as in the case of the first embodiment.

Further, in connection with items which appear in global guidelines and in the recommendations and regulations aimed at a specific industry, establishment of a security policy on the basis of the recommendations and regulations is desirable.

Fourth Embodiment

Designation of Global Guidelines by User

Establishment of a security policy based on global guidelines or recommendations and regulations aimed at a specific industry has been described thus far.

It is considered that a user may desire to establish a security policy on the basis of a certain global guideline. For example, in a certain nation (e.g., the U.S.), a specific global guideline (e.g., COBIT) has already been utilized as a defacto standard global guideline (COBIT will be described later). Against this backdrop, there are many cases where establishment of a security policy on the basis of this specific global guideline (e.g., COBIT) is desirable.

In the fourth embodiment, there is proposed construction of a global guideline to be utilized in establishing a security policy such that a user can designate the global guideline explicitly.

Figure 10:
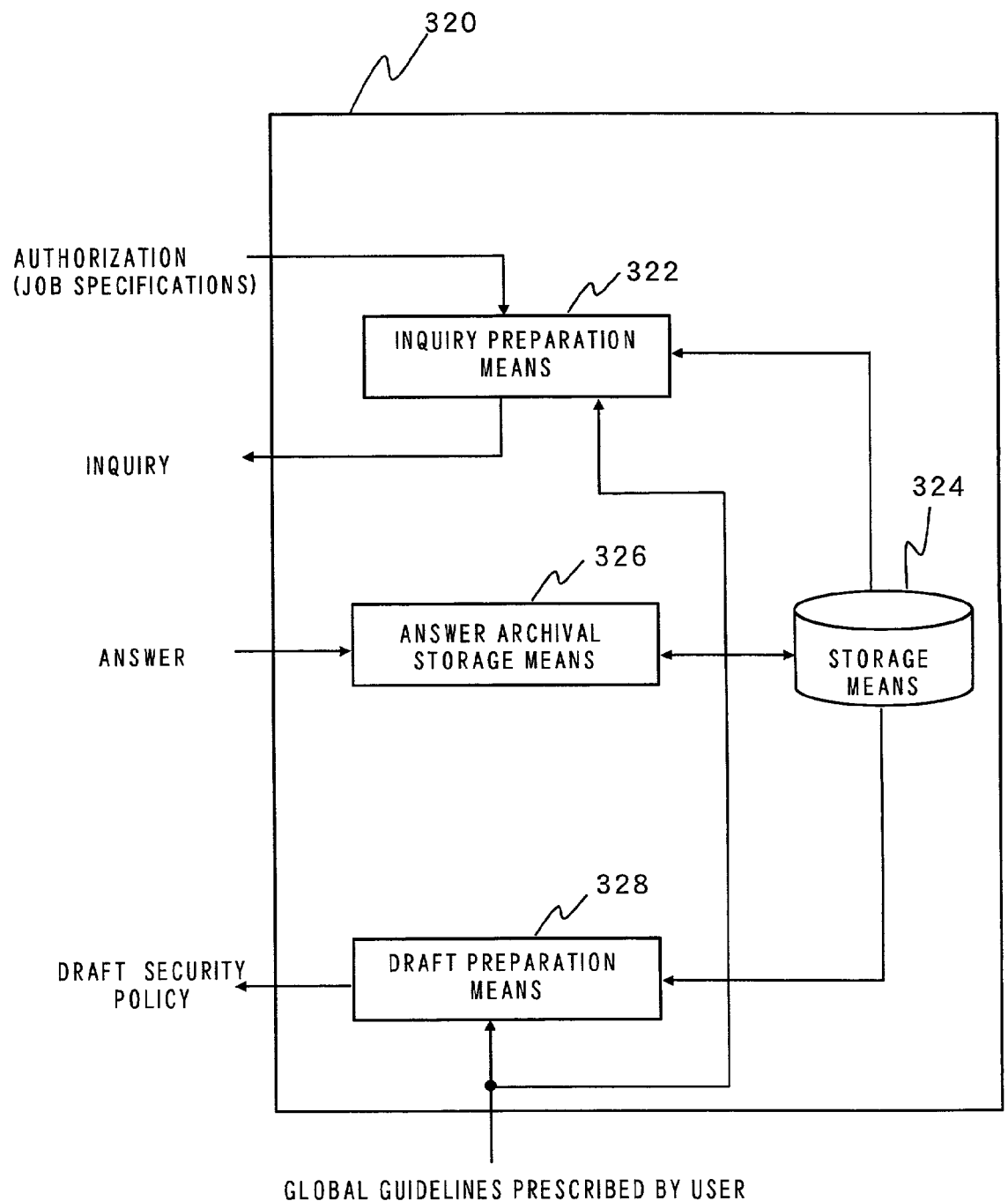
FIG. 10 is a block diagram showing the configuration of a security policy draft preparation apparatus according to a fourth embodiment of the present invention.

FIG. 10 is a block diagram showing the configuration of a security policy draft preparation apparatus 320 according to the fourth embodiment. As illustrated, information concerning the global guideline designated by the user is supplied to an inquiry preparation means 322 and to a draft preparation means 328.

The inquiry preparation means 322 prepares an inquiry (or inquiries) on the basis of job specifications of a member. In the fourth embodiment, during preparation of inquiries the inquiry preparation means 322 prepares inquiries complying with the global guideline designated by a user.

The draft preparation means 328 prepares a security policy draft on the basis of the global guideline prescribed by the user.

Operation required for preparing a security policy draft according to the fourth embodiment is substantially identical with that shown in FIG. 5 exclusive of the following points of difference.

A first difference lies in that in step S501 an inquiry complying with the global guideline prescribed by the user is prepared.

A second difference lies in that in step S5-4 a security policy draft complying with the global guideline prescribed by the user is prepared.

In the fourth embodiment, a global guideline to be used for establishing a security policy can be selected. Inquiries are prepared in compliance with the global guideline selected by the user, and a security policy draft is prepared on the basis of answers to the inquiries. Consequently, establishment of a security policy complying with the global guideline desired by the user becomes feasible.

For example, if a user has selected BS7799 to be described later, a security policy complying with (or to comply with) BS7788 can be established.

Global Guidelines

Examples of widely known global guidelines are provided below.

(1) BS7799

BS7799 was established by the BSI (British Standards Institution) in 1995. BS7799 prescribes fundamental management items (control) which summarize best practices in connection with information security.

When information assets must be protected regardless of the scale of an organization, in connection with an administration, an NGO (Non Governmental Organization), or an NPO (Non Profit Organization), to say nothing of an industry, standards of BS7799 are to be used as a code and reference of one type when the range of information security is clarified.

Hence, the standards of BS7799 have the same objective as that of ISO/IEC 13335 "IT security management guidelines (GMITS)" or that of ISO/IEC 15408 "IT security evaluation standards," which will be mentioned later. BS7799 differs from the global guidelines in the following two points.

First, other regulations specify details of security techniques while IT is taken as an object. In contrast, BS7799 provides comprehensive guides and references pertaining to a management system. Second, the object of BS7799 is not limited to an electronic medium. Various information assets, such as paper mediums, are taken as objectives of security.

Recently, BS7799 has gained international attention. As a matter of course, detailed individual control of information security is important. The reason for this is attributable to the following perception. As can be seen in requirements for system standards laid out in ISO 9000, a perception that a system for creating a management plan (through analysis of risk), monitoring distribution and management of required resources, and objectively reviewing the plan is effective for information security management is said to have become widespread.

BS7799 is constituted of two parts; that is, a first part relating to standards for implementing information security management, and a second part relating to specifications of an information security system. The first part describes best practices and provides guidelines for providing management advice. The second part describes development of a management framework and references for "system audit." The first part (BS7799-1) is now adopted by ISO as ISO17799.

(2) GASSP (Generally Accepted System Security Principles) is intended for promoting good practice and alleviating risk and influence of risk. GASSP employs an information security policy laid down by OECD in the form of a hierarchical model and extends details of the policy.

A policy which is in the highest hierarchical level and serves as a basic policy is called pervasive principles and posts a target security concept.

The policy of the next hierarchical level is called broad function principles and states specific implementation of the pervasive principles.

The policy of the next lower hierarchical level is called detailed principles and describes detailed security guidelines corresponding to an environment.

The policies describe management of privacy of an individual and that of an organization, as well as guidelines relating to management and products.

(3) GMITS

GMITS (The Guidelines for the Management of IT Security) is prepared by ISO (International Organization for Standardization). The GMITS is intended for setting standards pertaining to operation, management, and planning of the security of information technology.

GMITS consists of five parts:

Part 1: Concepts and models for IT Security

A general description of information security is provided in Part 1.

Part 2: Managing and Planning IT Security

Part 2 describes an operation analogous to a security life cycle.

Part 3: Techniques for the Management of IT Security

Part 3 describes details of the descriptions provided in Part 2.

Part 4: Selection of Safeguard

Part 4 describes the selection of security measures on the basis of the security rules.

Part 5: Management Guidance on Network Security

Part 5 is draft version such as preliminary revision, as far as now.

(4) ISO/IEC 15408 is a "Collection of Requirements" into which are compiled requirements pertaining to a security function which products or a system using information technology is to have (i.e., functional requirements) and requirements for seeking ascertainment of reliable implementation of a security function during the process of proceeding from the design phase to commercialization of a product (guarantee requirements).

(5) COBIT

COBIT (Control Objectives for Information and Related Technology) shows good practices of security suitable for a framework of a process extending over a plurality of fields and provides a manageable logical structure. The good practices are prepared on the basis of the consent of many experts. COBIT is a global guideline designed for serving in resolving a business risk or a gap between the necessity of control and a technical problem.

(6) EU Instructions

Here, EU instructions are officially known as "Instructions issued by the European Parliament and Board with regard to protection of an individual in connection with personal data processing and to free transfer of personal data." The EU instructions specify general rules concerning the legitimacy of personal data processing. More specifically, the EU instructions specify the principle of data quality, a principle on grounds for legitimacy of data processing, information to be given to a person whose personal data are to be processed, and the right of the person to access his/her own data.

Fifth Embodiment

Designation of Rigorousness

In the embodiments which have been described thus far, the rigorousness of a security policy has been adjusted manually, namely by user's operation in step S1-4 shown in FIG. 1.

However, when the rigorousness of a desired security policy has been determined beforehand, it is desirable to reflect the desired rigorousness on a security policy from the phase of preparation of security policy draft in step S1-2.

In step S4-1 shown in FIG. 1, the rigorousness of each rule has been artificially adjusted. However, if a user can define an indicator of rigorousness, specify the rigorousness of a security policy using the indicator, and automatically adjust the rigorousness of each rule on the basis of the thus-prescribed rigorousness, convenience will be afforded to the user.

The fifth embodiment is characterized in that the user can objectively specify the rigorousness of a security policy in steps S1-2 or S1-4 shown in FIG. 1.

In order to implement designation by the user of rigorousness of a security policy, in the sixth embodiment five types of indicators representing the rigorousness of a security policy are defined. The indicators are arranged in descending order of rigorousness. The "highest level" indicator has the highest level of rigorousness, and an "educational institution level" has the lowest level of rigorousness.

(1) Highest Level: representing the level of security rigorousness considered to be required by a government or a military organization;

(2) Financial Level: representing the level of security rigorousness considered to be required by a financial institution;

(3) International Level: representing the level of security rigorousness considered to be required by international enterprises;

(4) General Level: representing the level of security rigorousness considered to be required by domestic enterprises;

(5) Educational Institution Level: representing the level of rigorousness considered to be required by an educational institution.

Here, examples of five levels of security rigorousness are illustrated. As a matter of course, three levels of security rigorousness; namely, a highest level of security rigorousness, a medium level of security rigorousness, and a lowest level of security rigorousness, may be adopted.

5-A Establishment of Security Policy for which Rigorousness has been Designated

Utilization of indicators of rigorousness of a security policy in step S1-2 (FIG. 1) will now be described. When preparing a security policy draft in step S1-2 (FIG. 1), the user selects a desired security rigorousness from the above-described five levels of security rigorousness and instructs the selected level of security rigorousness to the draft preparation apparatus 20.

By means of the indicator of rigorousness, the user extracts from global guidelines a regulation having a desired rigorousness, thereby enabling preparation of a security policy draft of rigorousness desired by the user. Many of the global guidelines include indicators representing the rigorousness of a security policy. Hence, preparation of a security policy draft of desired rigorousness is feasible.

Extraction operation is to incorporate knowledge concerning the rigorousness of each global guideline into knowledge-based information, and to extract an appropriate rule from global guidelines on the basis of an indicator prescribed by the user by utilization of the knowledge-based information. Knowledge about rigorousness of each of global guidelines is knowledge produced by linking the five levels of security rigorousness with regulations corresponding to the indicators of rigorousness. Through use of such knowledge, regulations corresponding to a given indicator of rigorousness can be selected from the global guidelines.

Figure 11:
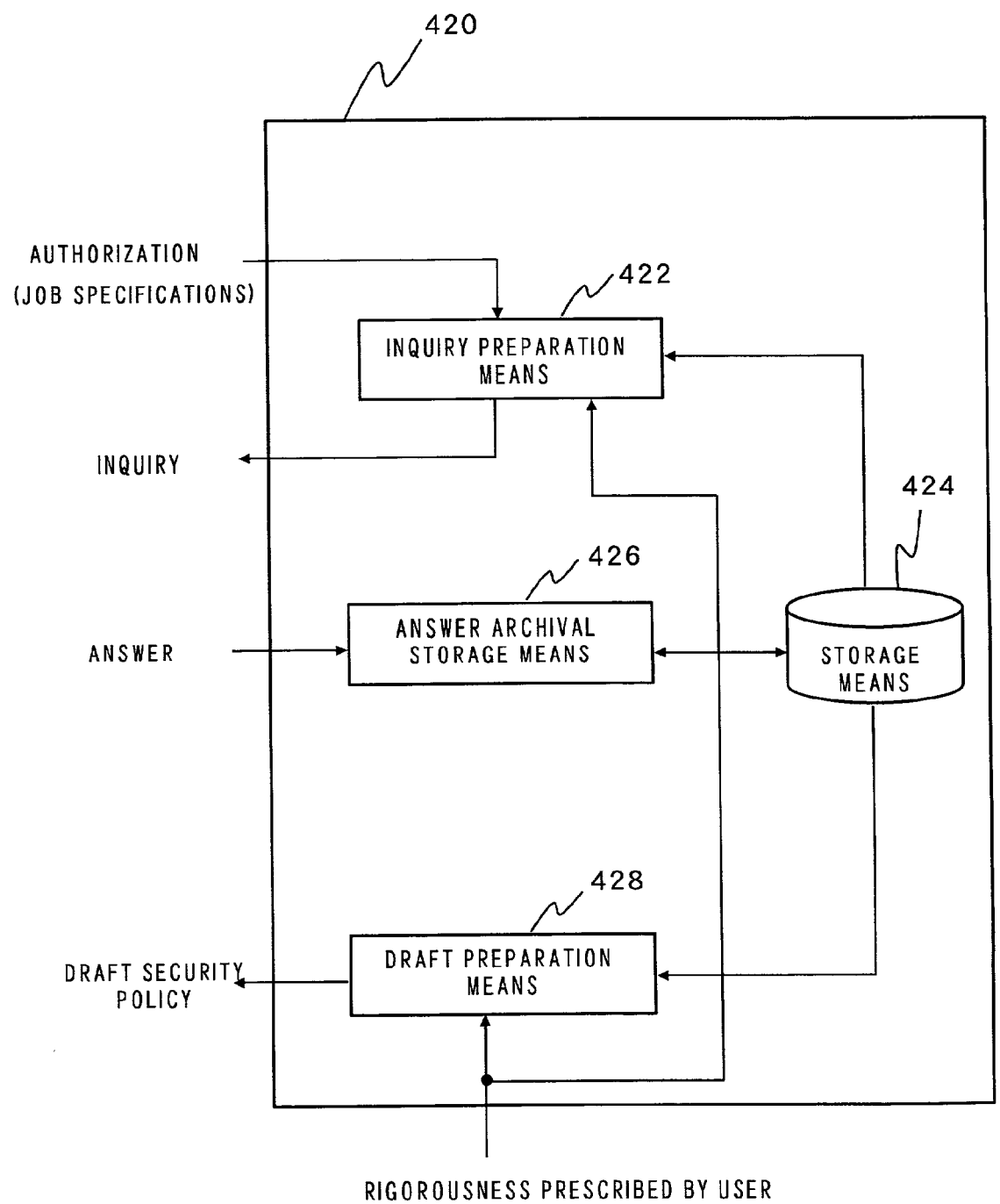
FIG. 11 is a block diagram showing the configuration of a security policy draft preparation apparatus according to a fifth embodiment of the present invention.

FIG. 11 is a block diagram showing the configuration of a security policy draft preparation apparatus 420 according to a fifth embodiment of the present invention. As illustrated, an indicator of rigorousness prescribed by the user is delivered to draft preparation means 428 in the security policy draft preparation apparatus 420.

On the basis of the indicator of rigorousness prescribed by the user, the draft preparation means 428 prepares a security policy draft. As mentioned above, a preparation operation is effected to use the knowledge-based information knowledge about a policy matching the prescribed indicator of rigorousness, and to extract from global guidelines a policy matching an indicator of rigorousness on the basis of the knowledge-based information. Briefly, this operation corresponds to pre-arrangement of a rule concerning setting of a policy in connection with a certain indicator of rigorousness (in the knowledge-based information).

Operation required for establishing a security policy according to the fifth embodiment is essentially identical with that described in connection with the flowchart shown in FIG. 5, exclusive of the following two points:

First, in step S5-1 the inquiry preparation means 422 prepares inquiries on the basis of the level of rigorousness prescribed by the user. "Level of rigorousness" has a smaller effect on inquiries than do other parameters (i.e., a field of business). In general, as the level of rigorousness is increased, prepared inquiries concern items of greater detail. Further, as the level of rigorousness is decreased, inquiries about detailed items are newly prepared.

It is considered that the rigorousness of a security policy is reset to a higher level after establishment of the security policy. In this case, a higher level of rigorousness prescribed by the user is supplied also to inquiry preparation means 422. Hence, the inquiry preparation means 422 prepares inquiries concerning items of greater detail. Consequently, there may arise a case where inquiries are provided to members (i.e., interrogees) of an organization once again in part.

If the level of rigorousness of a security policy is reset to a lower level, there is usually no chance of generating new inquiries. Consequently, in this case, a new security policy can be established immediately without implementation of inquiries.

Second, in step S5-4 the indicator of rigorousness prescribed by the user is supplied to the draft preparation means 428, and the draft preparation means 428 prepares a security policy draft on the basis of the indicator of rigorousness.

The operation required for establishing a security policy according to the fifth embodiment is essentially identical with that described in connection with the flowchart shown in FIG. 5, exclusive of the above-described two points.

Figure 12:
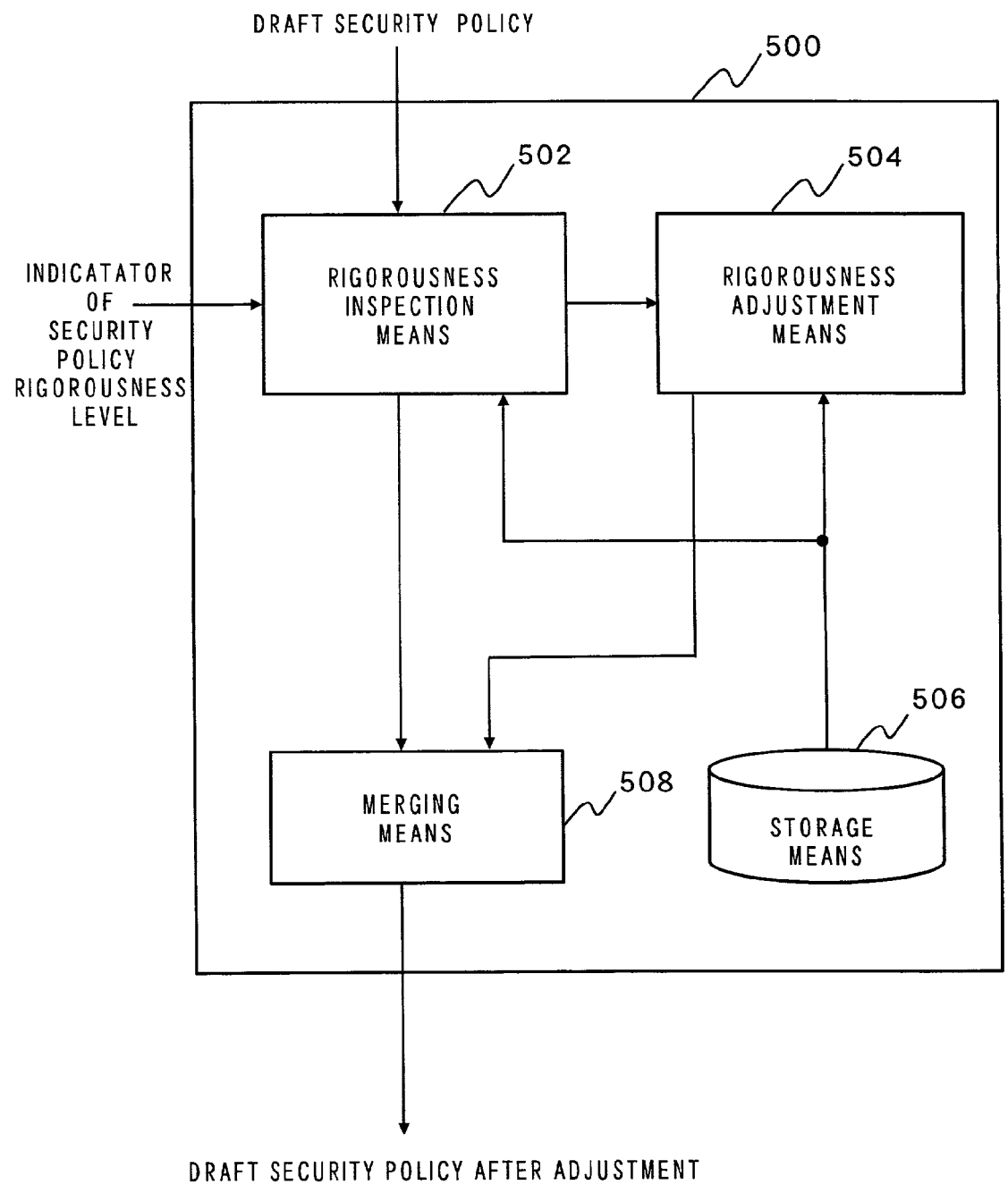
FIG. 12 is a block diagram showing the configuration of a security policy rigorousness adjustment apparatus according to the fifth embodiment of the present invention.

5-B Adjustment of Security Policy for which Level of Rigorousness has been Designated In the fifth embodiment, adjustment of a security policy is automatically effected in step S1-4 (FIG. 1). FIG. 12 is a block diagram showing the configuration of a security policy rigorousness adjustment apparatus 500 for effecting adjustment of such a security policy. As illustrated, the security policy rigorousness adjustment apparatus 500 comprises rigorousness inspection means 502, rigorousness adjustment means 504, storage means 506, and merging means 508.

The rigorousness inspection means 502 supplies a security policy draft produced by means of the operations up to step S1-3 (FIG. 1) On the basis of an indicator of rigorousness prescribed by the user, the rigorousness inspection means 502 inspects so as to determine whether each of the rules in a security policy draft matches the rigorousness prescribed by the user. If the result of inspection shows that each of the rules matches the prescribed rigorousness, the rules are output in their present forms. If some of the rules fail to match the prescribed rigorousness, the rules are supplied to rigorousness adjustment means 504. On the basis of the indicator of rigorousness prescribed by the user, the rigorousness adjustment means 504 rewrites the thus-supplied rules and outputs rewritten rules. Information pertaining to correlation between global guidelines, respective rules in the global guidelines, and an indicator of rigorousness is stored in the storage means 508.

Figure 13:
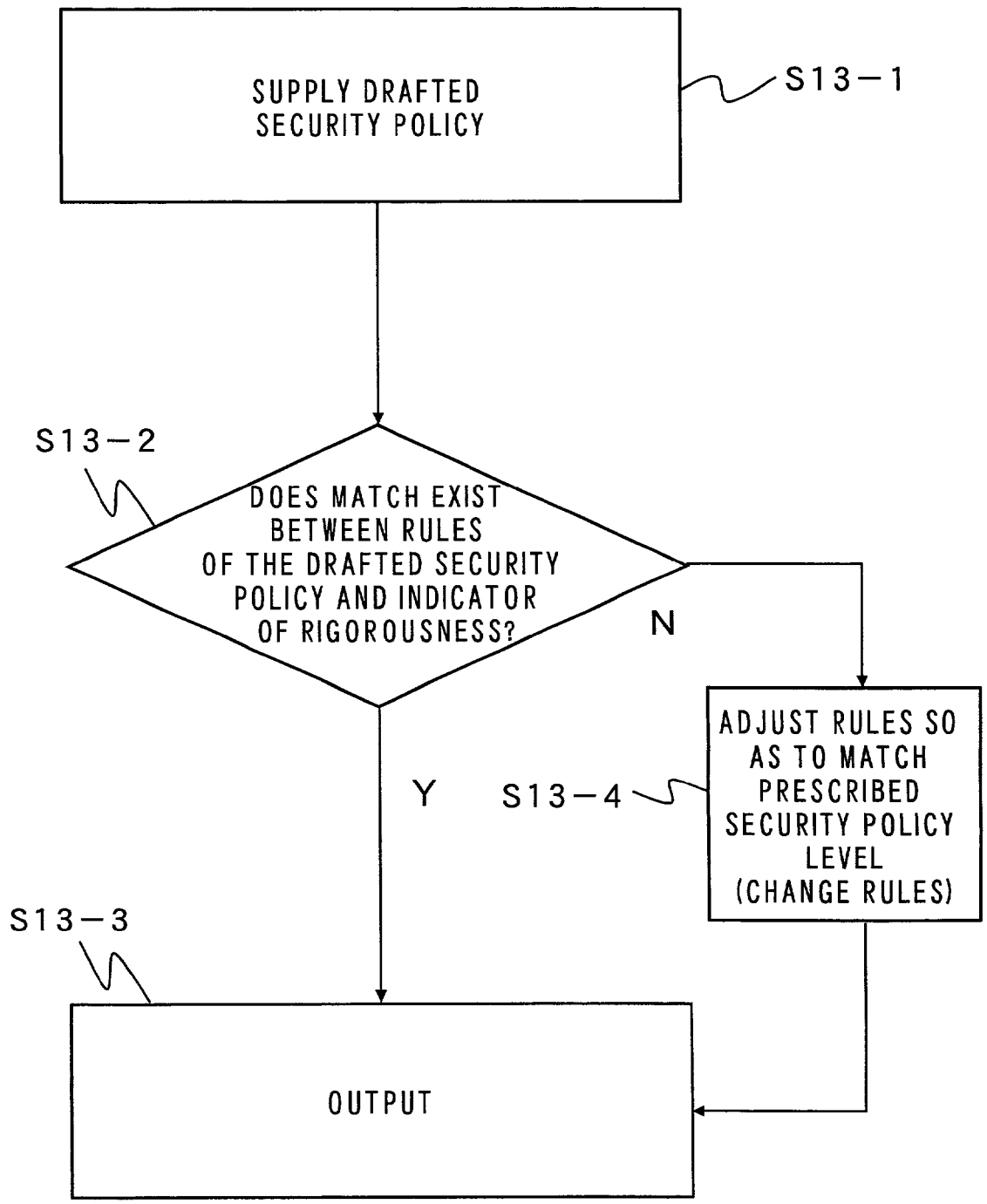
FIG. 13 is a flowchart showing operation of the security policy rigorousness adjustment apparatus according to the fifth embodiment.

FIG. 13 shows a flowchart representing the operation of the security policy rigorousness adjustment apparatus 500.

In step S13-1, a security policy draft is supplied to the rigorousness inspection means 502.

In step S13-2, the rigorousness inspection means 502 inspects so as to determine whether each of rules in the supplied security policy draft matches the indicator of rigorousness prescribed by the user. If the rules match the indicator of rigorousness, processing proceeds to step S14-3 to be described later. In contrast, if some of the rules fail to match the indicator of rigorousness, processing proceeds to step S14-4. In step S13-4, the rules which fail to match the indicator of rigorousness are changed so as to match the indicator, by means of the rigorousness adjustment means 504 and by utilization of information pertaining to correlation between the rules provided in the global guidelines and the indicator of rigorousness, which information is stored in the storage means 506. The information pertains to an indicator of rigorousness corresponding to each of the rules provided in the global guidelines. Utilization of the information enables ascertainment of rules matching the indicator of rigorousness prescribed by the user. The thus-ascertained rules are extracted from the global guidelines stored in the storage means 506. Rules which fail to match the indicator of rigorousness are replaced with the thus-extracted rules.

In step S13-3, the merging means 508 merges the rules that have from the beginning matched the indicator of rigorousness with the altered rules, and outputs the thus-merged rules.

Thus, each of the rules provided in the security policy draft can be matched with an indicator of rigorousness prescribed by the user.

The rigorousness inspection means 502, the rigorousness adjustment means 504, and the merging means 508 according to the fifth embodiment are preferably implemented in the form of software which runs on a computer. Further, the storage means 506 is preferably embodied as a storage medium, such as a hard disk drive, CD-ROM, or DVD.

Relationship Between Rule and Indicator of Rigorousness

A more detailed explanation is given of a case where in step S13-2 no match has been determined to exist between the rigorousness of rules and the indicator of rigorousness prescribed by the user.

If the rigorousness of the rules is of lower level than the rigorousness indicated by the indicator, the rules are determined to fail to match the indicator of rigorousness. The rules are replaced with rules of higher rigorousness level.

For example, if the rules are of an educational institution level and the rigorousness prescribed by the user is of a financial level, the rules are replaced with rules of a financial level. Moreover, a period of validity of a password is shortened from 120 days to 30 days. Thus, rules are replaced with more rigorous rules.

If rules are higher in level than the indicator of rigorousness, the rules are determined to fail to match the indicator of rigorousness. The rules are replaced with rules of lower rigorousness level.

If rules are at a highest level of rigorousness and the level of rigorousness prescribed by the user is at a general level, the rules are replaced with rules of general level of rigorousness. For example, in the case of rules of highest level of rigorousness, a period of validity of a password is one week. If the level of the rules is too rigorous, the user prescribes a general level of rigorousness. As a result, the period of validity of a password is extended to 100 days, and the rules are replaced with rules of lower level of rigorousness.

Sixth Embodiment

Selection of Range of Establishment

In the embodiments which have been described thus far, a security policy is prepared for the entirety of an organization. However, it is considered that there are many desires to establish a security policy for only a portion of the system of the organization.

The user prescribes a range within which a security policy is to be established. If an apparatus and method for establishing a security policy are adopted on the basis of the range, the user can establish a security policy within only an area where establishment of a security policy is desired, thus affording convenience to a user.

Figure 14:
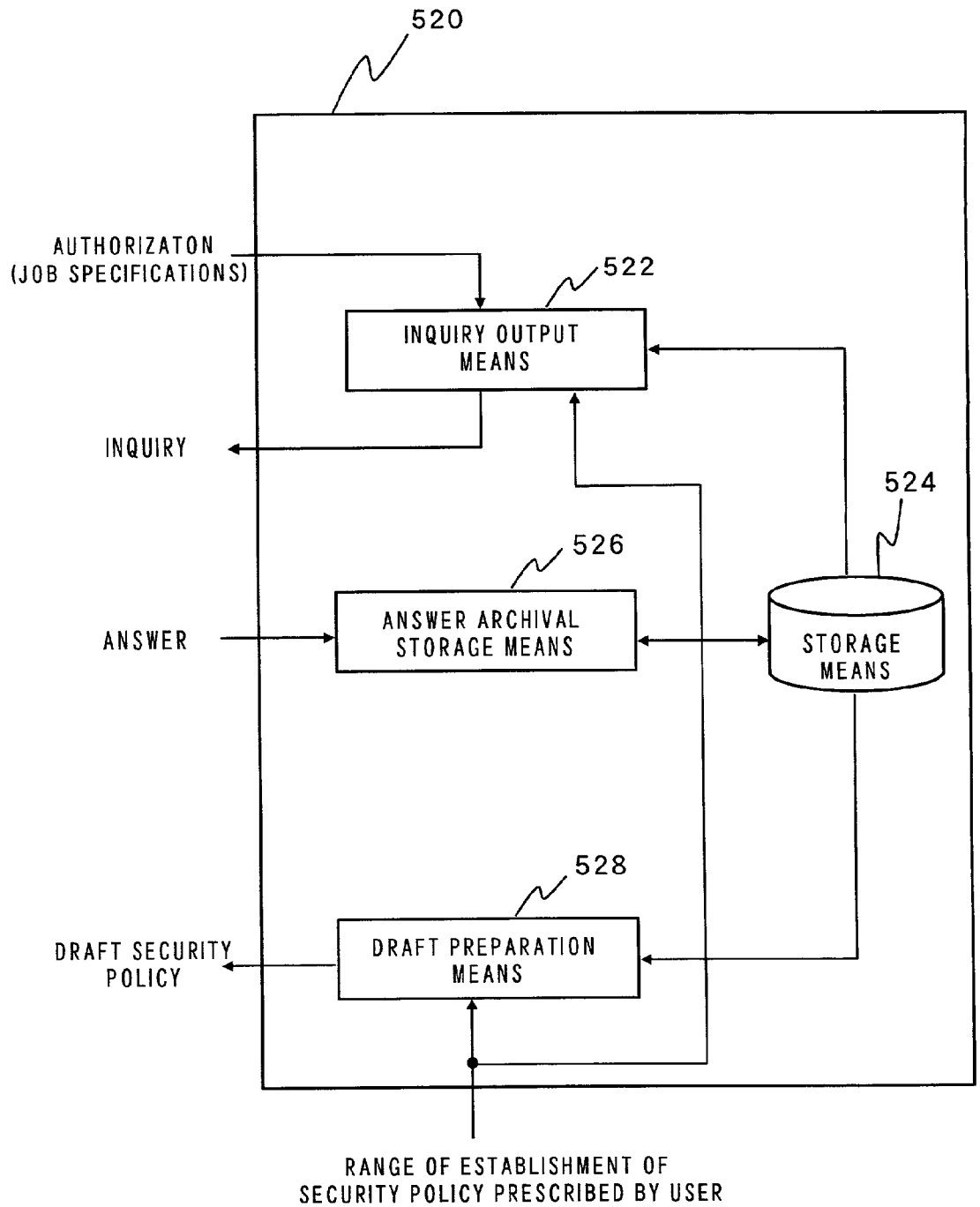
FIG. 14 is a block diagram showing the configuration of a security policy draft preparation apparatus according to a sixth embodiment of the present invention.

FIG. 14 is a block diagram showing the configuration of a security policy draft preparation apparatus 520. The thus-illustrated security policy draft preparation apparatus 520 is identical in configuration with the security policy preparation apparatus 320 described by reference to FIG. 10 and with the security policy preparation apparatus 420 described by reference to FIG. 11.

The two following points of difference are present.
A range of establishment of a security policy prescribed by the user is supplied to the draft preparation means 528.
A range of establishment of a security policy prescribed by the user is supplied to the inquiry preparation means 522.

By means of such a configuration, the draft preparation means 528 establishes a security policy within a range prescribed by the user, and hence the user can efficiently establish a security policy within a required range.

Further, the inquiry preparation means 522 prepares only inquiries about the range prescribed by the user, and hence useless inquiries are obviated, thus enabling conduct of efficient inquiries. Here, provision of the range prescribed by the user to the inquiry preparation means 522 is not inevitable. The reason for this is that the number of inquiries does not affect establishment of a security policy. If inquiries are irrelevant to the range prescribed by the user, an interviewer can skip the inquiries at the time of an interview. Consequently, supply of the range prescribed by the user to the inquiry preparation means 522 is not indispensable.

The user can specify the range of establishment of a security policy by means of various methods.

(1) First, the user can specify the range of establishment of a security policy on a product level. For example, if the user desires to establish a security policy concerning only "VPN," the user can establish a security policy concerning VPN by means of prescribing "VPN." By means of prescribing specific hardware or software, such as a WEB, an E-mail, or a firewall, or specific functions thereof, the user can specify establishment of a security policy concerning specific hardware or software.

Next, the user prescribes the range of establishment of a security policy according to an object of use of the security policy. For example, the user desires to establish a security policy only an "outside subcontract," a security policy can be established with regard to an area which is turned over to an outside contractor. The user can specify establishment of a security policy within a range of object of use or purpose, by means of prescribing the object of use of or purpose of electronic trading (E commerce) or a data center.

(3) Further, the user can specify the range of establishment of a security policy from the viewpoint of organizational structure. For example, if the user desires to establish a security policy in connection with only the "home office," the user can establish a security policy pertaining to the home office, by means of prescribing the "home office." If the user prescribes branch offices, a security policy pertaining to branch offices can be established. Moreover, the user can establish a security policy pertaining to a network or a security policy pertaining to a host by means of prescribing a network or a host.

Operation required for establishing a security policy according to the seventh embodiment is essentially identical with that shown in FIG. 5, exclusive of the following points of differences.

First, in step S5-4 shown in FIG. 5 a security policy draft is established on the basis of the range prescribed by the user.

Second, in step S5-1 shown in FIG. 5 inquiries pertaining to only the range prescribed by the user are prepared.

The second point of difference is not inevitable. As has been described, even when inquiries fall outside the range prescribed by the user, such inquiries do not directly pose a problem on establishment of a security policy. Further, it is also considered that an interviewer skips such inquiries, as required. Hence, there is no problem even when inquiries are identical with those described in connection with the first embodiment.

The draft preparation means 528 shown in FIG. 14 establishes a security policy draft. To this end, knowledge-based information concerning ranges within which the rules provided in the global guidelines fall is established in the storage means 524. More specifically, in the storage means 524 are stored knowledge-based information concerning whether rules fall within the range of "home office" or the range of "branch offices." By reference to the knowledge-based information, the draft establishment means 528 establishes a security policy (draft) through use of only the rules falling within the range prescribed by the user.

In this way, in the sixth embodiment, a security policy (draft) can be prepared within the range prescribed by the user.

The sixth embodiment has described an example in which the inquiry preparation means 522 prepares inquiries in accordance with job specifications of a member (or interviewee), as in the case of the first embodiment (FIG. 14). Here, the inquiry preparation means 522 may be arranged so as to provide a member with general inquiries regardless of his job specifications.

Seventh Embodiment

Programs and a Recording Medium

Preferably, the means which have been described thus far are actually embodied as programs and a processor executing the program.

Figure 15:
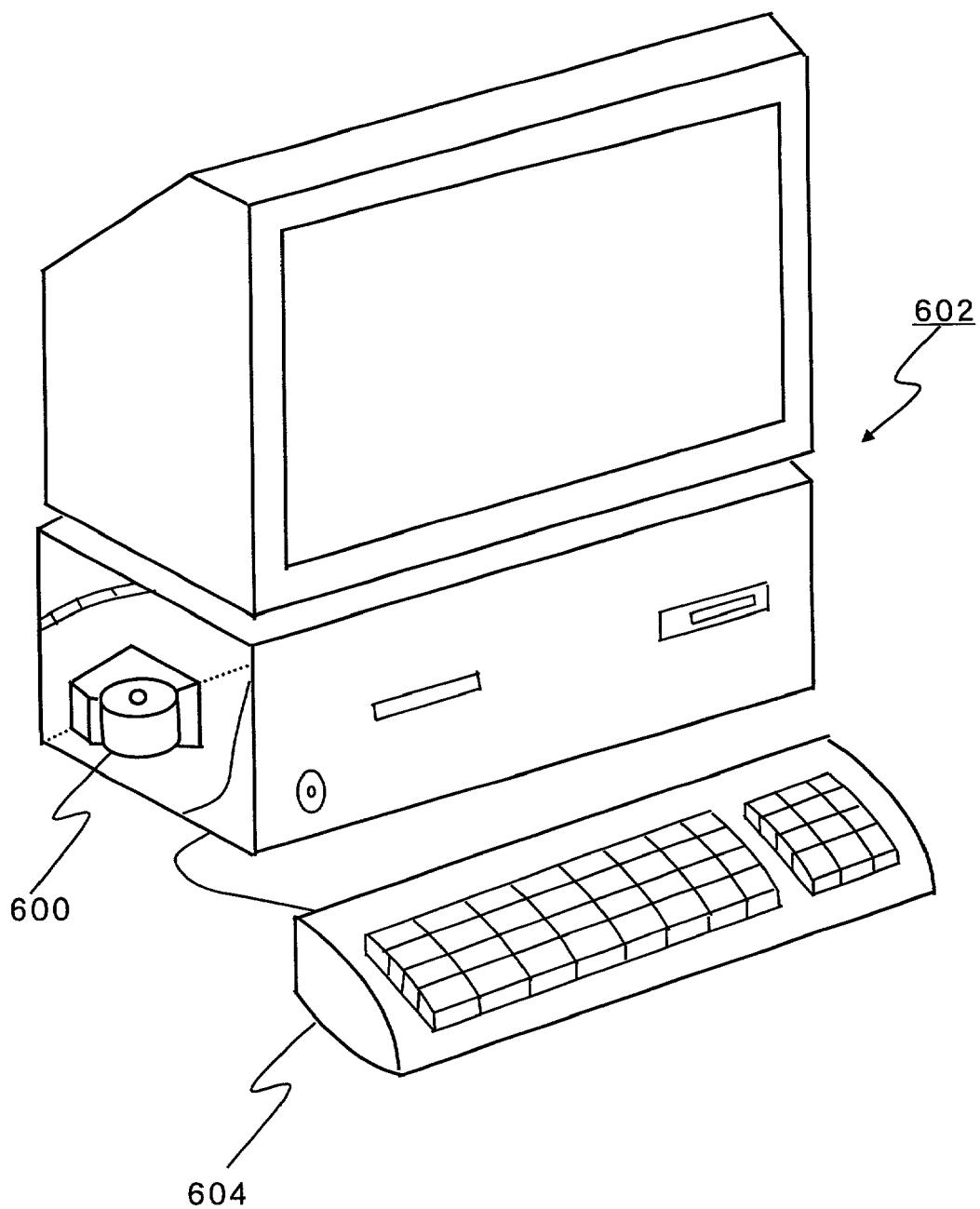
FIG. 15 is a descriptive view showing a computer and a hard disk drive provided therein according to an seventh embodiment.

FIG. 15 shows a computer 602 having a hard disk drive 600 having programs stored therein.

Programs for performing operations of the inquiry preparation means 12, the answer archival storage means 16, and the draft preparation means 18 described in connection with the first through seventh embodiments are stored in the hard disk drive 600. As a result of a processor of the computer 602 executing the programs, the computer 602 enables implementation of operations corresponding to the inquiry preparation means, the answer archival storage means, and the draft preparation means.

Programs for effecting operation of the contradiction inspection means 32, that of the contradiction output means 40, that of the matching means 41, that of the virtual information system establishment means 34, that of the difference output means 38, and that of the real system input means 36, all the means being shown in FIG. 7, are stored in the hard disk drive 600. By means of the processor of the computer 602 executing these programs, the computer 602 can effect operation of the contradiction inspection means 32 and operations of the other means.

Preferably, the storage means 14 described in connection with the embodiments is provided in the hard disk drive 600.

An operator of the computer 602 launches the foregoing programs, thereby generating inquiries and entering, by way of a keyboard 604, answers to the inquiries from members of an organization. As a matter of course, answers may be entered by use of an input device such as a mouse.

FIG. 15 shows an example in which programs run on the computer 602 of so-called standalone type. However, programs may be supplied over a network.

For example, there is preferably adopted an arrangement in which a client computer executes or downloads the foregoing programs stored in a server each time execution of the programs is required.

Security Policy Draft

The first through eighth embodiments have primarily described preparation of a security policy draft. Needless to say, the security policy draft preparation apparatus can be used for establishing a security policy which is not a draft. In other words, the security policy draft preparation apparatus doubles as a security policy establishment apparatus, and the method of preparing a security policy draft doubles as a method of establishing a security policy. The draft preparation means doubles as a security policy establishment means.

As has been described above, according to the present invention, inquiries are submitted to members of an organization, and a security policy is established on the basis of the resultant answers. Accordingly, a security policy can be established easily.

Further, a security policy is established stepwise, and hence flexible establishment of a security policy can be implemented while taking into consideration the organization's desires (e.g., a budget or the like).

According to the present invention, the state of information security of an organization is determined, so that the organization can be come aware of the importance of information security.

Since security measures can be provided together with the priority thereof, planning of measures for future information security becomes easy. Moreover, the organization can discuss a budget on the basis of the plan.

According to the present invention, a security policy can be established in consideration of line of business.

According to the present invention, the user can specify global guidelines to be used for establishing a security policy.

According to the present invention, a security policy is established through use of recommendations and regulations aimed at a specific line of business other than global guidelines. Hence, an elaborate security policy more preferably matching line of business can be established.

According to the present invention, the user can specify the level of rigorousness of security policy through use of an indicator of rigorousness. Further, according to the present invention, the level of rigorousness of a security policy can be adjusted through use of an indicator of rigorousness.

According to the present invention, the range of establishment of a security policy can be explicitly prescribed by the user. As a result, establishment of a security policy for a portion of an organization can be effected.

What is claimed is:

1. A method of generating a security policy for an organization, comprising:
   receiving a field of business identifier;
   receiving an indicator of rigorousness;
   generating security rules from a stored knowledge base based on the indicator of rigorousness;
   generating inquiries regarding the security rules based on the field of business identifier and the indicator of rigorousness;
   transmitting the generated inquiries to at least one user;
   receiving input from the at least one user in response to the transmitted inquiries;
   adjusting the security rules based on the received input and the indicator of rigorousness; and
   outputting the security policy that includes the security rules,
   wherein the security policy includes settings of individual equipment components within the organization that implements the security policy.

2. The method of generating a security policy according to claim 1, wherein transmitting the generated inquiries further comprises transmitting the generated inquiries to members of an organization for review and receiving input further comprises receiving input from the members of the organization.

3. The method of generating a security policy according to claim 2, further comprising generating an information system virtual design based on the received input, the level of rigorousness and the field of business identifier.

4. The method of generating a security policy according to claim 2, further comprising receiving job specifications of the members to receive the inquiries,
   wherein generating inquiries includes generating inquiries based upon the field of business identifier, the indicator of rigorousness and the received member job specifications.

5. The method of generating a security policy according to claim 3, wherein receiving input from the members of the organization includes:
   storing input received from a member;
   comparing input from other members to the stored input;
   retransmitting inquiries to members if contradictory inputs are received; and
   storing input received from members in response to retransmitted inquiries.

6. The method of generating a security policy according to claim 5, further comprising:
   assigning weights to contradictory inputs according to job specifications of the members if contradictory inputs are received from members in response to retransmitted inquiries; and
   displaying an estimated response based upon the weighted contradictory inputs.

7. The method of generating a security policy according to claim 5, further comprising:
   comparing the information system virtual design and a real information system design and updating the information system virtual design to correct identified differences, thereby obtaining a verified information system virtual design; and
   comparing the verified information system virtual design with the generated security policy draft to identify a first set of differences.

8. The method of generating a security policy according to claim 7, further comprising:
   assigning priorities to identified differences within the first set of differences; and
   generating a schedule for resolving the first set of differences based upon the priorities assigned.

9. The method of generating a security policy according to claim 7, further comprising generating an assessment of a security state of the organization based upon the first set of differences and the received level of rigorousness.

10. The method of generating a security policy according to claim 1, wherein the generated security policy draft includes recommendations for regulations aimed at a specific line of business.

11. The method of generating a security policy according to claim 1, wherein the stored knowledge base includes a set of global guidelines, recommendations or regulations aimed at a specific line of business.

12. The method of generating a security policy according to claim 11, wherein the inquiries are generated based upon the global guidelines.

13. The method of generating a security policy according to claim 1, wherein the stored knowledge base includes security rules related to at least three levels of security policy, including:
   executive-level security rules that describe an organization's policy concerning information security, in conformity with global guidelines;
   corporate-level security rules that describe an information security system embodying the executive-level information security policy; and
   product-level security rules that describe measures for implementing the executive-level security policy with reference to the corporate-level security policy.

14. The method of generating a security policy according to claim 13, wherein the corporate-level security policy includes security rules for the information security system of the overall organization; and includes security rules for individual equipment components constituting the information security system of the organization.

15. The method of generating a security policy according to claim 13, wherein the product-level security policy includes at least two types of product-level security rules, including:
   first-level product security rules that describe settings of individual equipment components constituting the information security system in natural language; and second-level product security rules that describe settings of individual equipment component constituting the information security system in a specific language used in each specific equipment component.

16. An apparatus for generating a security policy for an organization, comprising:
  means for receiving a field of business identifier;
  means for receiving an indicator of rigorousness;
  means for generating security rules from a stored knowledge base based on the indicator of rigorousness;
  means for generating inquiries regarding the security rules based on the field of business identifier and the indicator of rigorousness;
  means for transmitting the generated inquiries to at least one user;
  means for receiving input from the at least one user in response to the transmitted inquiries;
  means for adjusting the security rules based on the received input and the indicator of rigorousness; and
  means for outputting the security policy that includes the security rules,
  wherein the security policy includes settings of individual equipment components within the organization that implements the security policy.

17. The apparatus for generating a security policy according to claim 16, wherein the means for transmitting the generated inquiries further comprises means for transmitting the generated inquiries to members of an organization for review and the means for receiving input further comprises means for receiving input from the members of the organization.

18. The apparatus for generating a security policy according to claim 17, further comprising means for generating an information system virtual design based on the received input, the level of rigorousness and the field of business identifier.

19. The apparatus for generating a security policy according to claim 17, further comprising means for receiving job specifications of the members to receive the inquiries,
  wherein the means for generating inquiries includes means for generating inquiries based upon the field of business identifier, the indicator of rigorousness and the received member job specifications.

20. The apparatus for generating a security policy according to claim 18, wherein the means for receiving input from the members of the organization includes:
  means for storing input received from a member;
  means for comparing input from other members to the stored input;
  means for retransmitting inquiries to members if contradictory inputs are received; and
  means for storing input received from members in response to retransmitted inquiries.

21. The apparatus for generating a security policy according to claim 20, further comprising:
  means for assigning weights to contradictory inputs according to job specifications of the members if contradictory inputs are received from members in response to retransmitted inquiries; and
  means for displaying an estimated response based upon the weighted contradictory inputs.

22. The apparatus for generating a security policy according to claim 20, further comprising:
  means for comparing the information system virtual design and a real information system design and means for updating the information system virtual design to correct identified differences, thereby obtaining a verified information system virtual design; and
  means for comparing the verified information system virtual design with the generated security policy draft to identify a first set of differences.

23. The apparatus for generating a security policy according to claim 22, further comprising:
  means for assigning priorities to identified differences within the first set of differences; and
  means for generating a schedule for resolving the first set of differences based upon the priorities assigned.

24. The apparatus for generating a security policy according to claim 22, further comprising means for generating an assessment of a security state of the organization based upon the first set of differences and the received level of rigorousness.

25. The apparatus for generating a security policy according to claim 16, wherein the generated security policy draft includes recommendations for regulations aimed at a specific line of business.

26. The apparatus for generating a security policy according to claim 16, wherein the stored knowledge base includes a set of global guidelines, recommendations or regulations aimed at a specific line of business.

27. The apparatus for generating a security policy according to claim 26, wherein the inquiries are generated based upon the global guidelines.

28. The apparatus for generating a security policy according to claim 16, wherein the stored knowledge base includes security rules related to at least three levels of security policy, including:
  executive-level security rules that describe an organization's policy concerning information security, in conformity with global guidelines;
  corporate-level security rules that describe an information security system embodying the executive-level information security policy; and
  product-level security rules that describe measures for implementing the executive-level security policy with reference to the corporate-level security policy.

29. The apparatus for generating a security policy according to claim 28, wherein the corporate-level security policy includes security rules for the information security system of the overall organization; and includes security rules for individual equipment components constituting the information security system of the organization.

30. The apparatus for generating a security policy according to claim 28, wherein the product-level security policy includes at least two types of product-level security rules, including:
  first-level product security rules that describe settings of individual equipment components constituting the information security system in natural language; and
  second-level product security rules that describe settings of individual equipment components constituting the information security system in a specific language used in each specific equipment component.

31. A storage medium storing a set of program instructions executable on a data processing device and usable for generating a security policy for an organization, comprising:
  instructions for receiving a field of business identifier;
  instructions for receiving an indicator of rigorousness;
  instructions for generating security rules from a stored knowledge base based on the indicator of rigorousness;
  instructions for generating inquiries regarding the security rules based on the field of business identifier and the indicator of rigorousness;

instructions for transmitting the generated inquiries to at least one user;
instructions for receiving input from the at least one user in response to the transmitted inquiries;
instructions for adjusting the security rules based on the received input and the indicator of rigorousness; and
instructions for outputting the security policy that includes the security rules,
wherein the security policy includes settings of individual equipment components within the organization that implements the security policy.

32. The storage medium according to claim 31, wherein the instructions for transmitting the generated inquiries further comprise instructions for transmitting the generated inquiries to members of an organization for review and instructions for receiving input further comprises receiving input from the members of the organization.

33. The storage medium according to claim 32, further comprising instructions for generating an information system virtual design based on the received input, the level of rigorousness and the field of business identifier.

34. The storage medium according to claim 32, further comprising instructions for receiving job specifications of the members to receive the inquiries,
wherein the instructions for generating inquiries includes instructions for generating inquiries based upon the field of business identifier, the indicator of rigorousness and the received member job specifications.

35. The storage medium according to claim 33, wherein the instructions for receiving input from the members of the organization includes:
instructions for storing input received from a member;
instructions for comparing input from other members to the stored input;
instructions for retransmitting inquiries to members if contradictory inputs are received; and
instructions for storing input received from members in response to retransmitted inquiries.

36. The storage medium according to claim 35, further comprising:
instructions for assigning weights to contradictory inputs according to job specifications of the members if contradictory inputs are received from members in response to retransmitted inquiries; and
instructions for displaying an estimated response based upon the weighted contradictory inputs.

37. The storage medium according to claim 35, further comprising:
instructions for comparing the information system virtual design and a real information system design and updating the information system virtual design to correct identified differences, thereby obtaining a verified information system virtual design; and
instructions for comparing the verified information system virtual design with the generated security policy draft to identify a first set of differences.

38. The storage medium according to claim 37, further comprising:
instructions for assigning priorities to identified differences within the first set of differences; and
instructions for generating a schedule for resolving the first set of differences based upon the priorities assigned.

39. The storage medium according to claim 37, further comprising instructions for generating an assessment of a security state of the organization based upon the first set of differences and the received level of rigorousness.

* * * * *